United States Patent
Yamagishi

(10) Patent No.: US 11,159,860 B2
(45) Date of Patent: Oct. 26, 2021

(54) RECEIVING DEVICE AND RECEIVING METHOD, REPRODUCING DEVICE AND REPRODUCING METHOD, SUPPLY DEVICE AND SUPPLY METHOD, AND PROGRAM

(71) Applicant: Saturn Licensing LLC, New York, NY (US)

(72) Inventor: Yasuaki Yamagishi, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 16/306,330

(22) PCT Filed: May 25, 2017

(86) PCT No.: PCT/JP2017/019494
§ 371 (c)(1),
(2) Date: Nov. 30, 2018

(87) PCT Pub. No.: WO2017/212931
PCT Pub. Date: Dec. 14, 2017

(65) Prior Publication Data
US 2019/0174205 A1   Jun. 6, 2019

(30) Foreign Application Priority Data
Jun. 8, 2016 (JP) .............................. JP2016-114359

(51) Int. Cl.
*H04N 21/845* (2011.01)
*H04N 21/8543* (2011.01)
(Continued)

(52) U.S. Cl.
CPC ......... *H04N 21/8456* (2013.01); *G06F 13/00* (2013.01); *H04L 65/4076* (2013.01);
(Continued)

(58) Field of Classification Search
CPC ............. H04N 21/8456; H04N 21/438; H04N 21/2183; H04N 21/222; H04N 21/2353
See application file for complete search history.

(56) References Cited

U.S. PATENT DOCUMENTS

| 2006/0215583 A1* | 9/2006 | Castagnoli .............. H04L 45/60 370/254 |
| 2011/0205920 A1* | 8/2011 | Ohnishi .................. H04L 47/29 370/252 |

(Continued)

FOREIGN PATENT DOCUMENTS

| CN | 103384994 A | 11/2013 |
| CN | 103959733 A | 7/2014 |

(Continued)

OTHER PUBLICATIONS

International Search Report dated Jul. 25, 2017, in PCT/JP2017/019494, filed May 25, 2017.

(Continued)

*Primary Examiner* — Yassin Alata
(74) *Attorney, Agent, or Firm* — Oblon, McClelland, Maier & Neustadt, L.L.P.

(57) ABSTRACT

A receiving device includes a receiving unit configured to receive a segment file constituting a stream of content, a reproducing unit configured to acquire and reproduce the received segment file, and a proxy server unit configured to generate supply availability information including a probability at which the segment file can be supplied to the reproducing unit, in which the proxy server unit generates the supply availability information in response to a request for the segment file from the reproducing unit and supplies the segment file received by the receiving unit to the reproducing unit, and the reproducing unit requests the proxy server unit to transmit a segment file to be reproduced (Continued)

next on the basis of the generated supply availability information. The device can be applied to stream delivery systems.

12 Claims, 31 Drawing Sheets

(51) Int. Cl.
| | | |
|---|---|---|
| *H04N 21/2343* | (2011.01) | |
| *H04N 21/472* | (2011.01) | |
| *G06F 13/00* | (2006.01) | |
| *H04L 29/06* | (2006.01) | |
| *H04N 21/438* | (2011.01) | |
| *H04L 29/08* | (2006.01) | |
| *H04N 21/2183* | (2011.01) | |
| *H04N 21/222* | (2011.01) | |
| *H04N 21/235* | (2011.01) | |

(52) U.S. Cl.
CPC .......... *H04L 65/4084* (2013.01); *H04L 67/02* (2013.01); *H04N 21/2183* (2013.01); *H04N 21/222* (2013.01); *H04N 21/2353* (2013.01); *H04N 21/23439* (2013.01); *H04N 21/438* (2013.01); *H04N 21/47202* (2013.01); *H04N 21/8543* (2013.01)

(56) References Cited

U.S. PATENT DOCUMENTS

| | | |
|---|---|---|
| 2013/0060956 A1 | 3/2013 | Nagaraj et al. |
| 2015/0006621 A1 | 1/2015 | Westphal |
| 2015/0381755 A1 | 12/2015 | Li et al. |
| 2016/0373546 A1* | 12/2016 | Lotfallah ............ H04L 65/4084 |
| 2018/0139254 A1* | 5/2018 | Oyman ................ H04L 65/605 |

FOREIGN PATENT DOCUMENTS

| | | |
|---|---|---|
| CN | 104041111 A | 9/2014 |
| WO | WO 2013089437 A1 | 6/2013 |

OTHER PUBLICATIONS

Hirabayashi, M. et al. "Realization the Uninterrupted Video Distribution in the Existing Web Server", Nikkei Electronics, Mar. 19, 2012, 21 pages (with English translation).

* cited by examiner

FIG. 11

Table1-ResourceStatus(with baseURL) parameters
STATUS OF EACH TARGET baseUrl

| Parameter | Type | Cardinality | Description |
|---|---|---|---|
| ResourceStatus | object | 1 | Resource Status Information for resources identified from a base URL. |
| baseURL | url | 1 | Provides the base URL for the associated resources. i.e. the status holds for all resources referenced by this base URL. baseUrl OF DESCRIPTION TARGET RESOURCES OF MESSAGE |
| status | enum | 1 | Provides the status of all associated resource to the base URL. The defined types are documented in Table. STATUS OF RESOURCES DESIGNATED BY baseUrl. |
| probability (EXTENSION OF PRESENT DISCLOSURE) | int | 0..1 | RELATIVE RECEPTION PROBABILITY TO TARGET RESOURCES (DESIGNATED BY baseUrl) DESCRIBED BY OTHER ResourceStatus. COMPARISON TARGET RANGE AND THE LIKE ARE ASSUMED TO BE DECIDED BY OPERATION. |
| reason | string | 0..1 | Provides some textual information of the reason. e.g. 'you are in broadcast mode'. INDICATES (CURRENT DEFINITION) REASON "BROADCASTING MODE" (EXTENSION OF PRESENT DISCLOSURE) STRUCTURED SO THAT RECEPTION METRICS SUCH AS RECEPTION STATE AND METADATA CAN BE STORED. |

*FIG. 12*

Table3—allowed values for status parameter status PARAMETER LIST

| Status | Semantics |
|---|---|
| available | Resource is available in DANE and request is expected to be responded with a 2xx code. AVAILABLE |
| unavailable | Resource is not available in the DANE and request is expected to be responded with a 4xx code. UNAVAILABLE |
| cached | Resource is already cached in the DANE. ALREADY CACHED |

FIG. 13

Table2-ResourceStatus (with representation ID) parameters
STATUS OF EACH TARGET representationID

| Parameter | Type | Cardinality | Description |
|---|---|---|---|
| ResourceStatus | object | 1 | Resource Status Information for segments identified from a representation ID. |
| repID | string | 1 | Provides the value for the representation id. i.e. status holds for all resources associated to a Representation with the value of the parameter. representationId OF DESCRIPTION TARGET RESOURCES OF MESSAGE |
| status | enum | 1 | Provides the status of all associated resource to the Representation. The defined types are documented in Table. STATUS OF TARGET RESOURCES DESIGNATED BY repID |
| probability (EXTENSION OF PRESENT DISCLOSURE) | int | 0..1 | RELATIVE RECEPTION PROBABILITY TO TARGET RESOURCES (DESIGNATED BY repID) DESCRIBED BY OTHER ResourceStatus. COMPARISON TARGET RANGE AND THE LIKE ARE ASSUMED TO BE DECIDED BY OPERATION. |
| reason | string | 0..1 | Provides some textual information of the reason. e. g. 'you are in broadcast mode'. INDICATES (CURRENT DEFINITION) REASON (EXTENSION OF PRESENT DISCLOSURE) STRUCTURED SO THAT RECEPTION METRICS SUCH AS RECEPTION STATE AND METADATA CAN BE STORED. |

FIG. 14

Table4-DaneResourceStatus parameters

| Parameter | | | Type | Cardinality | Description |
|---|---|---|---|---|---|
| DaneResourceStatus | | | | 1 | Provides the status of the resources listed below |
| | status | | enum | 1 | Specifies the resources that can be assigned to this type. The define types are documented in<br><br>STATUS SPECIFIED IN Table5 |
| | resource | | anyURI | 0...N | Provides a resource for which the status applies URL OF RESOURCES HAVING THIS STATUS |
| | | bytes | string | 0...1 | If present qualifies that the status only applies to the byte range provided in this attribute. The string shall conform to the byte-range-set according to RFC7233, clause 2.1. INDICATES THAT ABOVE STATUS CORRESPONDS TO ONLY RESOURCES FOR RANGE OF BYTE RANGE OF ABOVE RESOURCES. If not present, the status applies to the full resource. INDICATES THAT IT IS STATUS FOR ALL OF ABOVE RESOURCES IF NOT PRESENT. |
| | resourceGroup | | string | 0...N | Provides a group of resources for which the status applies. GROUP OF RESOURCES TO WHICH STATUS CORRESPONDS |
| | probability (EXTENSION OF PRESENT DISCLOSURE) | | int | 0...1 | RELATIVE RECEPTION PROBABILITY TO TARGET Resources (OR ResourceGroup) DESCRIBED BY OTHER DaneResourceStatus. COMPARISON TARGET RANGE AND THE LIKE ARE ASSUMED TO BE DECIDED BY OPERATION. |
| | reason (EXTENSION OF PRESENT DISCLOSURE) | | string | 0...1 | Provides the reason why above status is applied. REASON OF ABOVE STATUS |

FIG. 15

Table5—allowed values for status parameter

| Status | Semantics |
|---|---|
| cached | Resource is already cached in the DANE. CACHED. |
| unavailable | Resource is not available in the DANE and request is expected to be responded with a 4xx code. UNAVAILABLE. STATUS 4xx CODE IS RETURNED. |
| unknown | Resource is not available in the DANE and request will be forwarded to origin server. UNAVAILABLE. REQUEST IS FORWARDED TO ORIGIN SERVER. |
| promised | Resource will be available in the DANE at the time announced in the Media Presentation. BECOMES AVAILABLE AT TIME DECLARED BY MPD. |

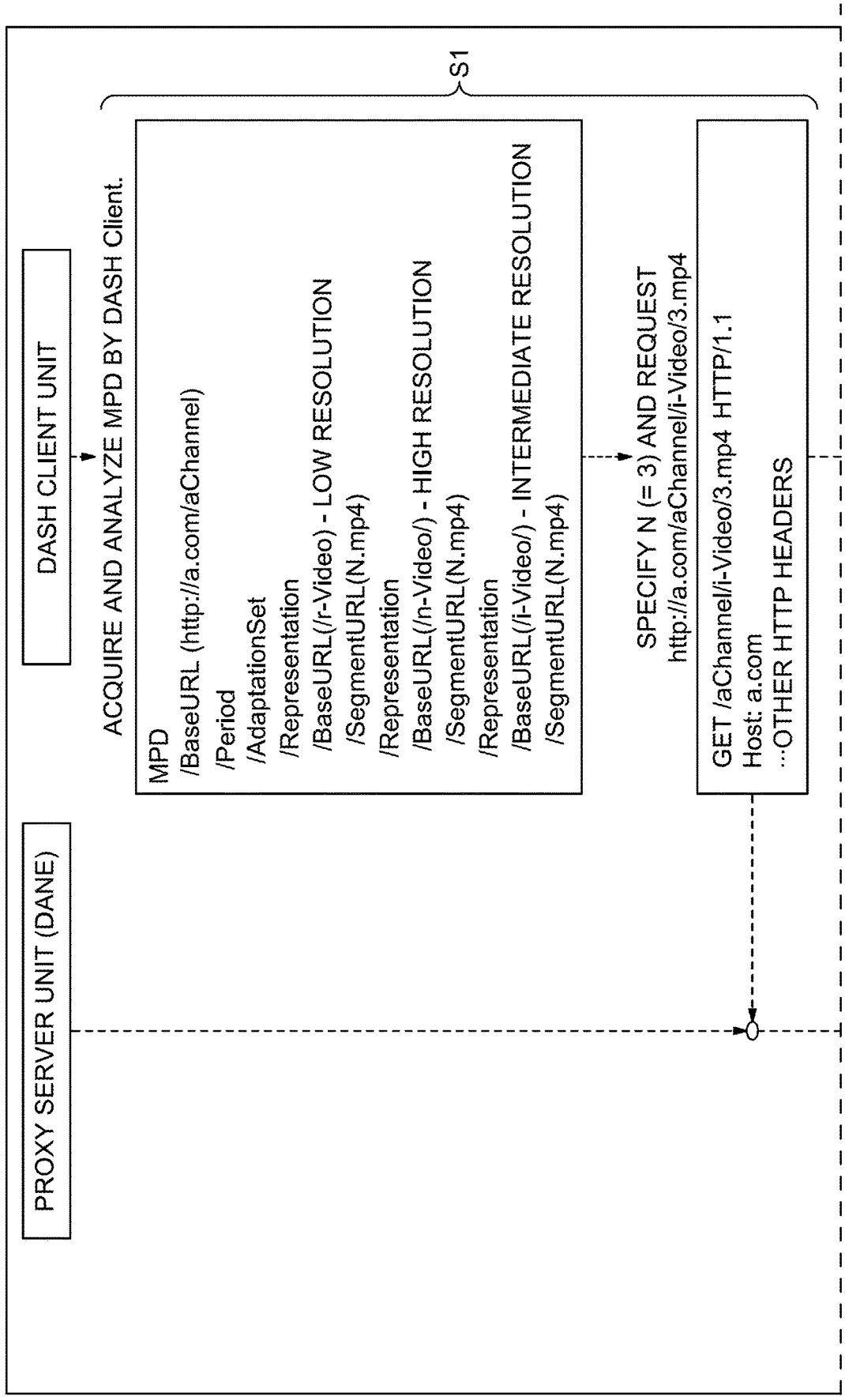

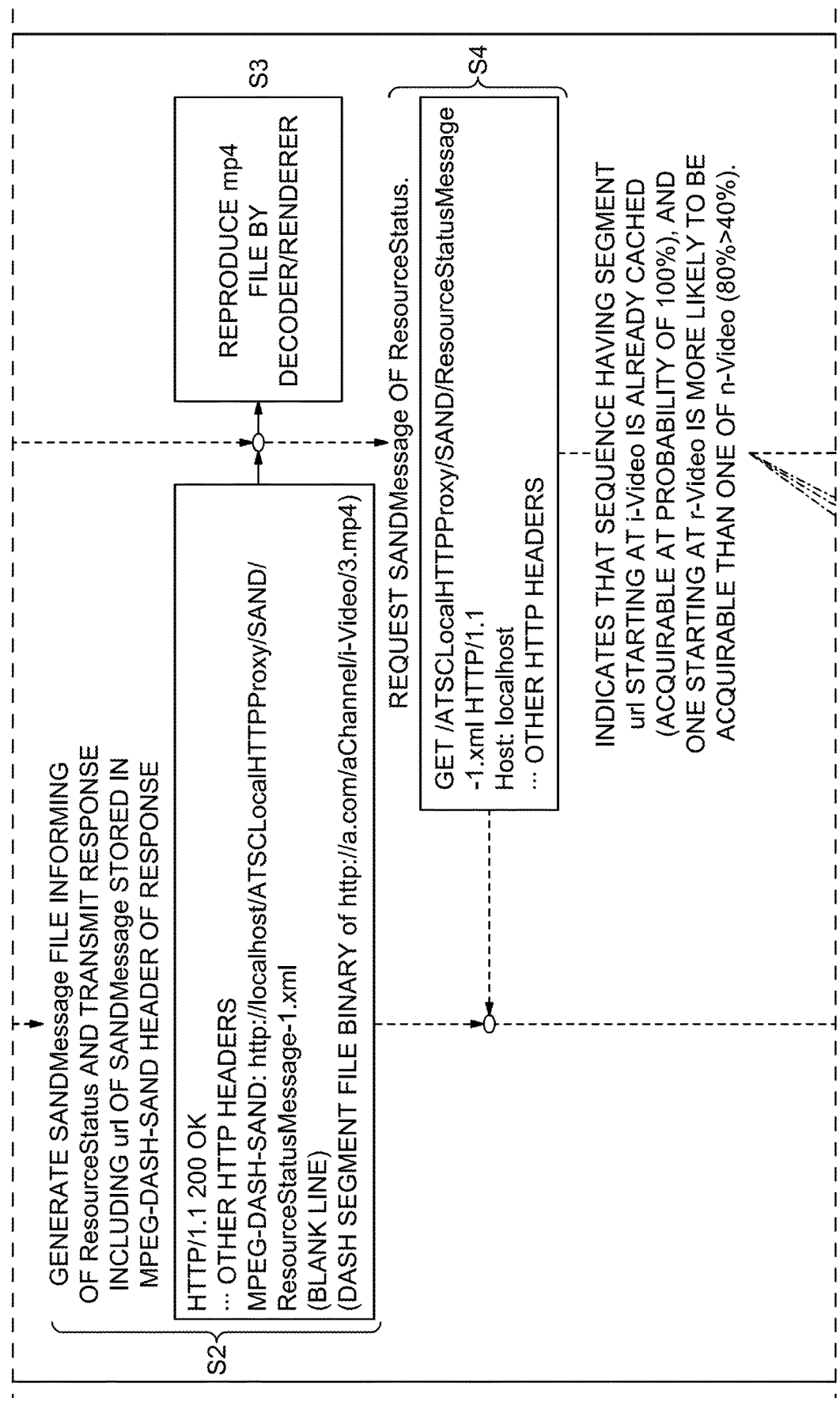

FIG. 17

```
SAND Message ①

HTTP/1.1 200 OK
...OTHER HTTP HEADERS
(BLANK LINE)
<SANDMessage>
  <ResourceStatus messageId=123
    baseURL='http://a.com/aChannel/r-Video' status='available' probability='50' reason='...uKAmS8...'/>
  <ResourceStatus messageId=124
    baseURL='http://a.com/aChannel/n-Video' status='available' probability='20' reason='...2NoZW1...'/>
  <ResourceStatus messageId=125
    baseURL='http://a.com/aChannel/i-Video' status='available' probability='30' reason='...vblF1YW...'/>
</SANDMessage>
```

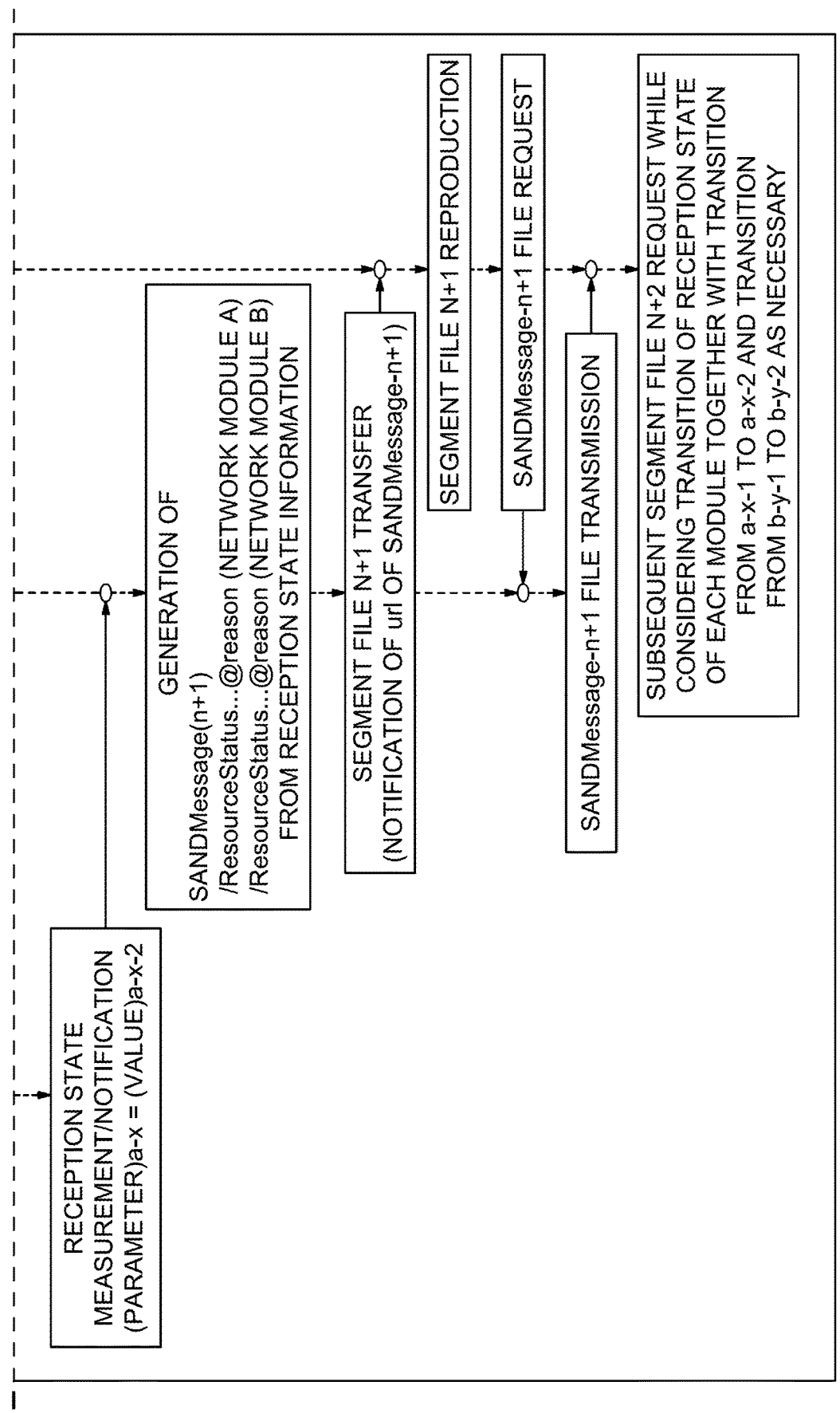

RECEIVING DEVICE AND RECEIVING METHOD, REPRODUCING DEVICE AND REPRODUCING METHOD, SUPPLY DEVICE AND SUPPLY METHOD, AND PROGRAM

TECHNICAL FIELD

The present disclosure relates to a receiving device and a receiving method, a reproducing device and a reproducing method, a supply device and a supply method, and a program, and more particularly, to a receiving device and a receiving method, a reproducing device and a reproducing method, a supply device and a supply method, and a program which are capable of transmitting a notification of a receiving state of content of a proxy which caches broadcast or delivered content and delivers broadcast or delivered content to the outside.

BACKGROUND ART

As the flow of standardization in an Internet streaming such as IPTV, standardization of a scheme applied to video on demand (VoD) streaming by HTTP streaming, live streaming, and the like is being performed.

In particular, dynamic adaptive streaming over HTTP (DASH) being standardized in ISO/IEC/MPEG attracts attention (for example, see Non-Patent Document 1).

Here, an overview of DASH will be described. FIG. 1 illustrates an example of a configuration of a stream delivery system in which DASH is employed. A Media Presentation on HTTP Server illustrated on a left side of FIG. 1 is a content supply side, and a HTTP Streaming Client illustrated on a right side of FIG. 1 is a content receiving side and is able to receive and reproduce received content and supply the content to a user who reproduces it.

A Media Presentation on HTTP Server on the supply side can prepare and supply a plurality of streams which are content of the same substance and have an image quality, an angle of view size, and the like which are changed depending on a capability or a state of the receiving side or a communication environment of a broadcasting network such as terrestrial digital broadcasting, satellite broadcasting, or the like serving as a path, a two-way communication network such as the Internet, a mobile telephone communication network such as 3GPP or LTE-eMBMS. On the other hand, the HTTP Streaming Client on the receiving side can select, acquire, and reproduce an optimum stream in accordance with a communication environment of the path, the capability or the state of the receiving side, or the like, among a plurality of streams prepared by the supply side.

As described above, in DASH, metadata called media presentation description (MPD) is supplied from the content supply side to the receiving side so that the receiving side can adaptively select and acquire the stream.

An address (url information) of a chunked stream (media data such as audios, videos, subtitles, and the like) is described in the MPD, and the receiving side can access a predetermined server serving as a content supply source on the basis of the url information and acquire and reproduce streaming data which is HTTP-delivered.

By the way, the HTTP Streaming Client on the receiving side which is overwhelmingly larger in number than the supplying side may request the same stream to the same server as the content supply source. In this case, since communication efficiency is poor in a case where the same stream is transmitted each time in accordance with the supply from each HTTP Streaming Client, installing a so-called proxy server on the Internet or the like has been proposed.

Further, installing a function equivalent to the above-mentioned proxy server in the HTTP Streaming Client on the receiving side has been also proposed.

CITATION LIST

Non-Patent Document

Non-Patent Document 1: Mitsuhiro Hirabayashi, "Achieving Uninterrupted Video Streaming Using Existing Web Servers", NIKKEI ELECTRONICS, Mar. 19, 2012

SUMMARY OF THE INVENTION

Problems to be Solved by the Invention

If the proxy server is installed on the Internet or the like, the receiving side has a function equivalent to the proxy server, and the receiving side can acquire the reception state or the like of the stream in the proxy server or the like as described above, it is possible to efficiently select the proxy server as a content acquisition destination or to acquire content directly from the server of the content supply source without going through the proxy server or the like.

However, in the present situation, the receiving side can only acquire information indicating whether or not a desired stream has already been cached in the proxy server or the like, and a method of acquiring the reception state or the like of the stream in the proxy server or the like has not been established.

The present disclosure was made in light of the foregoing, and it is desirable to make it possible to acquire the reception state of the stream from the proxy server or the like.

Solutions to Problems

A receiving device which is a first aspect of the present disclosure includes: a receiving unit configured to receive a segment file constituting a stream of content; a reproducing unit configured to acquire and reproduce the segment file received by the receiving unit; and a proxy server unit configured to generate supply availability information including a probability at which a segment file possibly requested by the reproducing unit can be supplied to the reproducing unit on the basis of a reception state of the segment file by the receiving unit, in which the proxy server unit generates the supply availability information in response to a request for the segment file from the reproducing unit and supplies the segment file received by the receiving unit to the reproducing unit, and the reproducing unit requests the proxy server unit to transmit a segment file to be reproduced next on the basis of the generated supply availability information.

The receiving unit can receive the segment file via a broadcasting network, a two-way communication network, or a mobile telephone communication network.

The proxy server unit can include a caching unit configured to cache the segment file received by the receiving unit, and can supply the segment file cached in the caching unit to the reproducing unit in a case where the segment requested from the reproducing unit is cached in the caching unit.

The proxy server unit can generate the supply availability information further including reception metrics for a data path in which the segment file possibly requested by the reproducing unit is received and values of the reception metrics on the basis of the reception state of the segment file by the receiving unit.

The proxy server unit can generate the supply availability information obtained by extending a ResourceStatus message according to a SAND protocol.

The proxy server unit can generate the supply availability information obtained by extending a DaneResourceStatus message according to a SAND protocol.

The proxy server unit can store acquisition destination information of the supply availability information in a header of a response according to the request of the segment file from the reproducing unit and stores binary data of the segment file in a body of the response.

A receiving method which is the first aspect of the present disclosure is a receiving method of a receiving device including a receiving unit configured to receive a segment file constituting a stream of content, a reproducing unit configured to acquire and reproduce the segment file received by the receiving unit, and a proxy server unit configured to generate supply availability information including a probability at which a segment file possibly requested by the reproducing unit can be supplied to the reproducing unit on the basis of a reception state of the segment file by the receiving unit, the receiving method including: a first request step of requesting, by the reproducing unit, the proxy server unit to transmit the segment file; a supply step of generating, by the proxy server unit, the supply availability information in response to the request for the segment file from the reproducing unit and supplying the segment file received by the receiving unit to the reproducing unit; and a second request step of requesting, by the reproducing unit, the proxy server unit to transmit the segment file to be reproduced next on the basis of the supply availability information.

A program which is the first aspect of the present disclosure is a program for causing a computer to function as: a receiving unit configured to receive a segment file constituting a stream of content; a reproducing unit configured to acquire and reproduce the segment file received by the receiving unit; and a proxy server unit configured to generate supply availability information including a probability at which a segment file possibly requested by the reproducing unit can be supplied to the reproducing unit on the basis of a reception state of the segment file by the receiving unit, in which the proxy server unit generates the supply availability information in response to a request for the segment file from the reproducing unit and supplies the segment file received by the receiving unit to the reproducing unit, and the reproducing unit requests the proxy server unit to transmit a segment file to be reproduced next on the basis of the generated supply availability information.

In the first aspect of the present disclosure, the request for the segment file is transmitted to the proxy server unit, the supply availability information is generated in response to the request, and the received segment file is supplied to the reproducing unit. Further, the segment file to be reproduced next is requested on the basis of the supply availability information.

A reproducing device which is a second aspect of the present disclosure is a reproducing device connected to a supply device that supplies content via a predetermined network, including: a requesting unit configured to request the supply device to transmit a segment file constituting the content on the basis of supply availability information generated by the supply device; and a reproducing unit configured to reproduce the segment file supplied from the supply device in response to the request, in which the supply device includes a receiving unit configured to receive the segment file constituting a stream of the content, and a proxy server unit configured to generate the supply availability information including a probability at which the segment file possibly requested by the reproducing device can be supplied to the reproducing device on the basis of a reception state of the segment file by the receiving unit.

The predetermined network can be a LAN.

A reproducing method which is the second aspect of the present disclosure is a reproducing method of a reproducing device connected to a supply device that supplies content via a predetermined network, including: a first request step of requesting, by the reproducing device, the supply device to transmit a segment file constituting the content; a reproduction step of reproducing, by the reproducing device, the segment file supplied from the supply device in response to the request; and a second request step of requesting, by the reproducing device, the supply device to transmit a segment file to be reproduced next on the basis of the supply availability information generated by the supply device, in which the supply device includes a receiving unit configured to receive the segment file constituting a stream of the content, and a proxy server unit configured to generate the supply availability information including a probability at which the segment file possibly requested by the reproducing device can be supplied to the reproducing device on the basis of a reception state of the segment file by the receiving unit.

A program which is the second aspect of the present disclosure is a program for causing a computer connected to a supply device that supplies content via a predetermined network to function as: a requesting unit configured to request the supply device to transmit a segment file constituting the content on the basis of supply availability information generated by the supply device; and a reproducing unit configured to reproduce the segment file supplied from the supply device in response to the request, in which the supply device includes a receiving unit configured to receive the segment file constituting a stream of the content, and a proxy server unit configured to generate the supply availability information including a probability at which the segment file possibly requested by the reproducing device can be supplied to the reproducing device on the basis of a reception state of the segment file by the receiving unit.

In the second aspect of the present disclosure, the request for the segment file constituting the content is transmitted to the supply device, the segment file supplied from the supply device is reproduced in response to the request, and the request for the segment file to be reproduced next is transmitted to the supply device on the basis of the supply availability information generated by the supply device.

A supply device which is a third aspect of the present disclosure is a supply device that supplies content to a reproducing device via a predetermined network, including: a receiving unit configured to receive a segment file constituting a stream of the content; and a proxy server unit configured to generate supply availability information including a probability at which the segment file possibly requested by the reproducing device can be supplied to the reproducing device on the basis of a reception state of the segment file by the receiving unit in response to a request for the segment file from the reproducing device and supply the segment file received by the receiving unit to the reproducing device.

A supply method which is the third aspect of the present disclosure is a supply method of a supply device including a receiving unit configured to receive a segment file constituting a stream of content, the supply device supplying the segment file to a reproducing device via a predetermined network, the supply method including: a generation step of generating, by the supply device, supply availability information including a probability at which the segment file possibly requested by the reproducing device can be supplied to the reproducing device on the basis of a reception state of the segment file by the receiving unit in response to a request for the segment file from the reproducing device; and a supply step of supplying the segment file received by the receiving unit to the reproducing device.

A program which is the third aspect of the present disclosure is a program for causing a computer that supplies content to a reproducing device via a predetermined network to function as: a receiving unit configured to receive a segment file constituting a stream of the content; and a proxy server unit configured to generate supply availability information including a probability at which the segment file possibly requested by the reproducing device can be supplied to the reproducing device on the basis of a reception state of the segment file by the receiving unit in response to a request for the segment file from the reproducing device and supply the segment file received by the receiving unit to the reproducing device.

In the third aspect of the present disclosure, the supply availability information including the probability at which the segment file possibly requested by the reproducing device can be supplied to the reproducing device is generated on the basis of the reception state of the segment file by the receiving unit in response to the request for the segment file from the reproducing device, and the segment file received by the receiving unit is supplied to the reproducing device.

Effects of the Invention

According to the first aspect of the present disclosure, the reproducing unit can acquire supply availability information from the proxy server unit.

According to the second aspect of the present disclosure, it is possible to acquire the supply availability information from the supply device and request the segment file to be reproduced next on the basis of the supply availability information.

According to the third aspect of the present disclosure, it is possible to generate the supply availability information to be supplied to the reproducing device.

BRIEF DESCRIPTION OF DRAWINGS

FIG. 11 is a diagram illustrating a first data structure of ResourceStatus expanded for use as supply availability information.

FIG. 12 is a diagram illustrating information stored in a status of ResourceStatus.

FIG. 13 is a diagram illustrating a second data structure of ResourceStatus expanded for use as supply availability information.

FIG. 14 is a diagram illustrating a data structure of DaneResourceStatus expanded for use as supply availability information.

FIG. 15 is a diagram illustrating information stored in a status of DaneResourceStatus.

MODE FOR CARRYING OUT THE INVENTION

Hereinafter, a best mode (hereinafter referred to as an "embodiment") for carrying out the present disclosure will be described in detail with reference to the appended drawings.

<Description of Overview of DASH>

First, an overview of DASH will be described in further detail.

Figure 2:
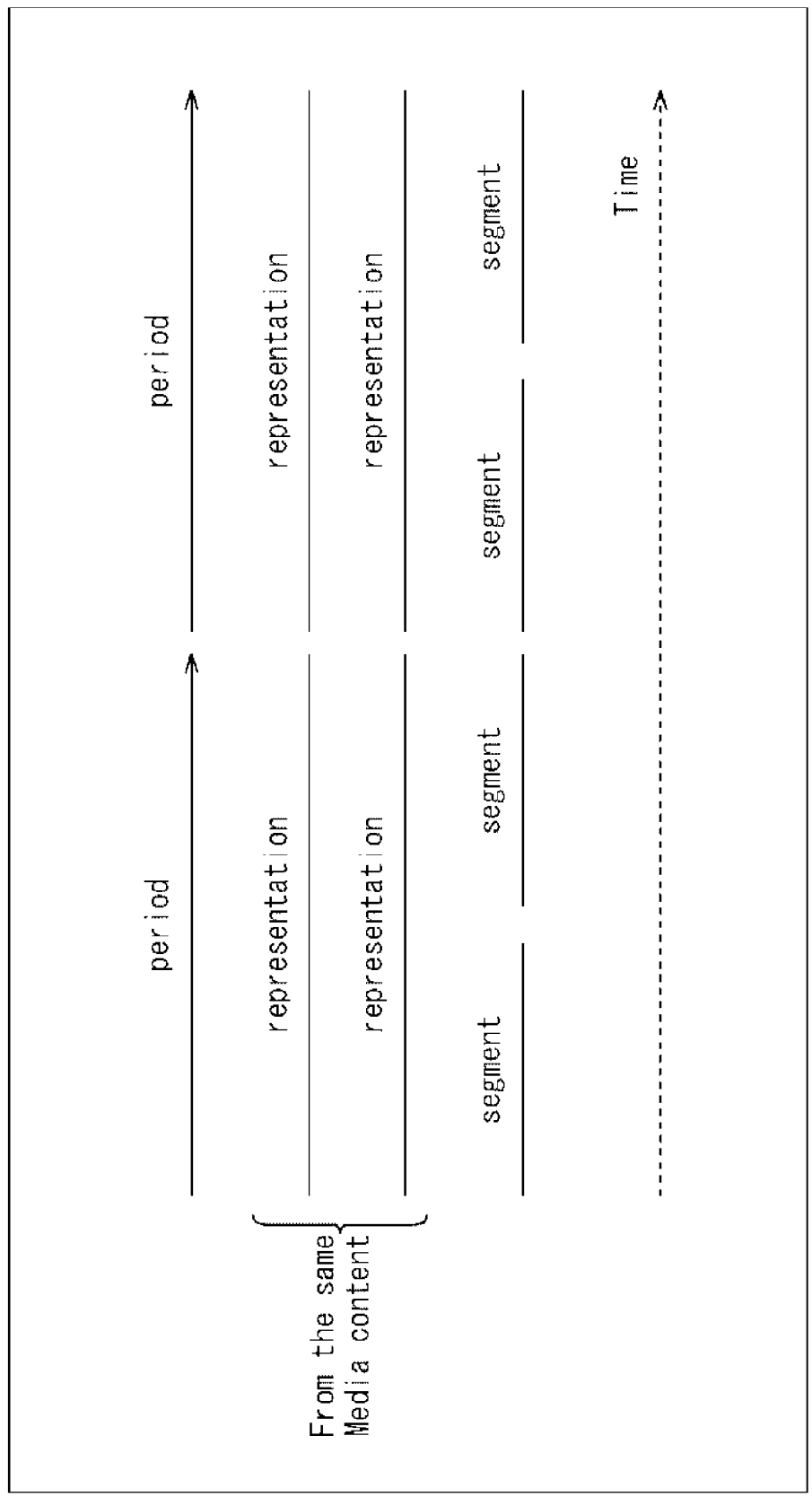
FIG. 2 is a diagram illustrating a relation of a Period, a Representation, and a Segment which indicate a stream of content.

FIG. 2 illustrates the relation of a Period, a Representation, and a Segment, which indicate data units related to a stream of content delivered in the content delivery system in which DASH is employed.

The Period is a unit of a temporal separation of content. The Segment is a unit acquired by subdividing the Period temporally, and a stream of content includes files in units of Segments.

The Representation is a term indicating a stream which has the same content and has an attribute such as a bit rate differing as an image quality or an angle of view size is changed, and a plurality of Representations are prepared for content of the same substance.

Figure 3:
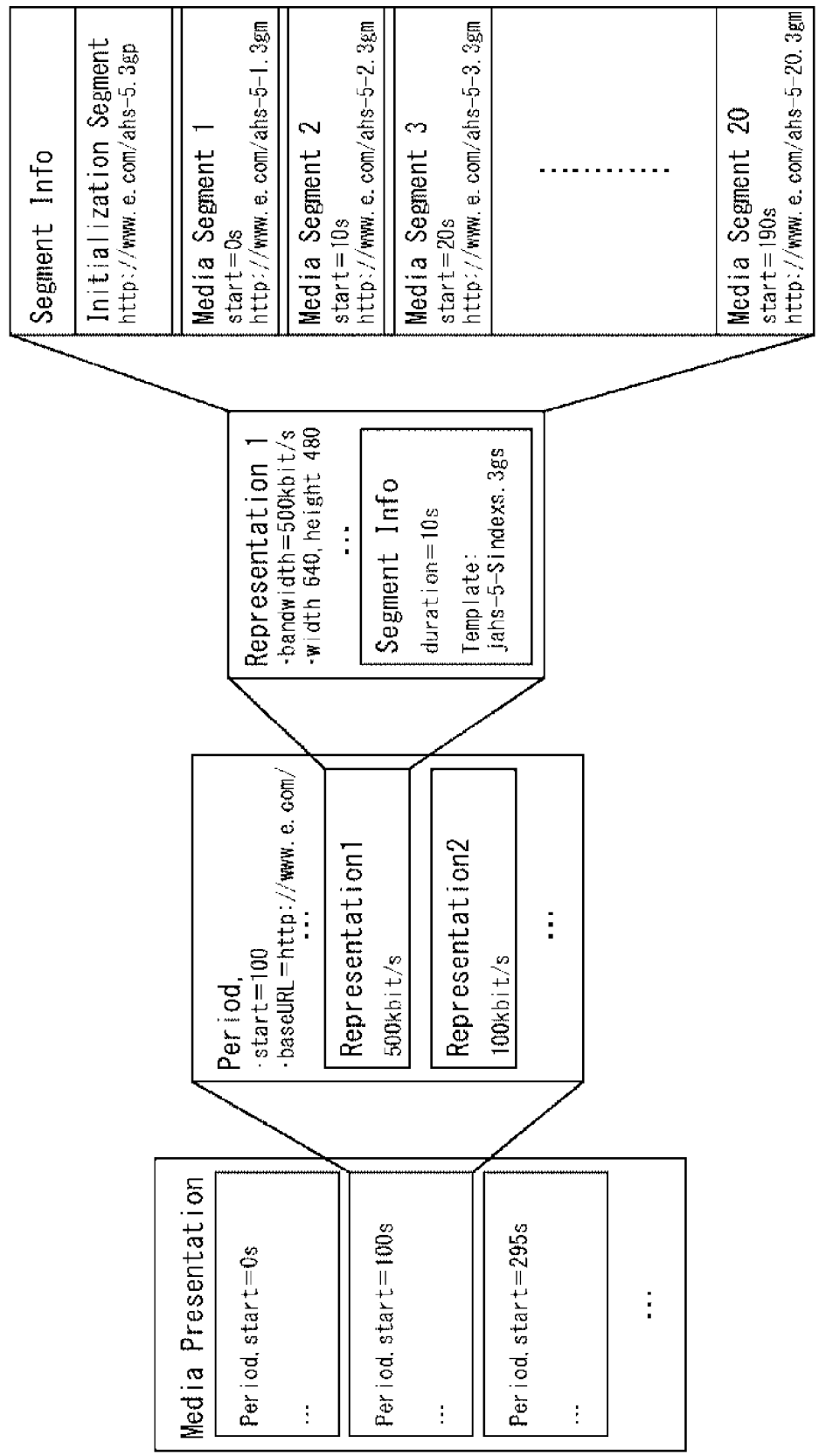
FIG. 3 is a diagram illustrating a data structure of an MPD.

FIG. 3 illustrates a data structure of an MPD serving as metadata supplied from a content supply side to a receiving side.

In the MPD, information related to content is classified in units of Periods. In each period, a plurality of Representations are prepared including information related to synchronized streaming data which has the same contents and has a stream attribute such as a bit rate differing as an image content, an angle of view size, a language, or the like is changed. Information related to a segment obtained by further dividing the Period temporally is stored in the Representation.

Figure 4:
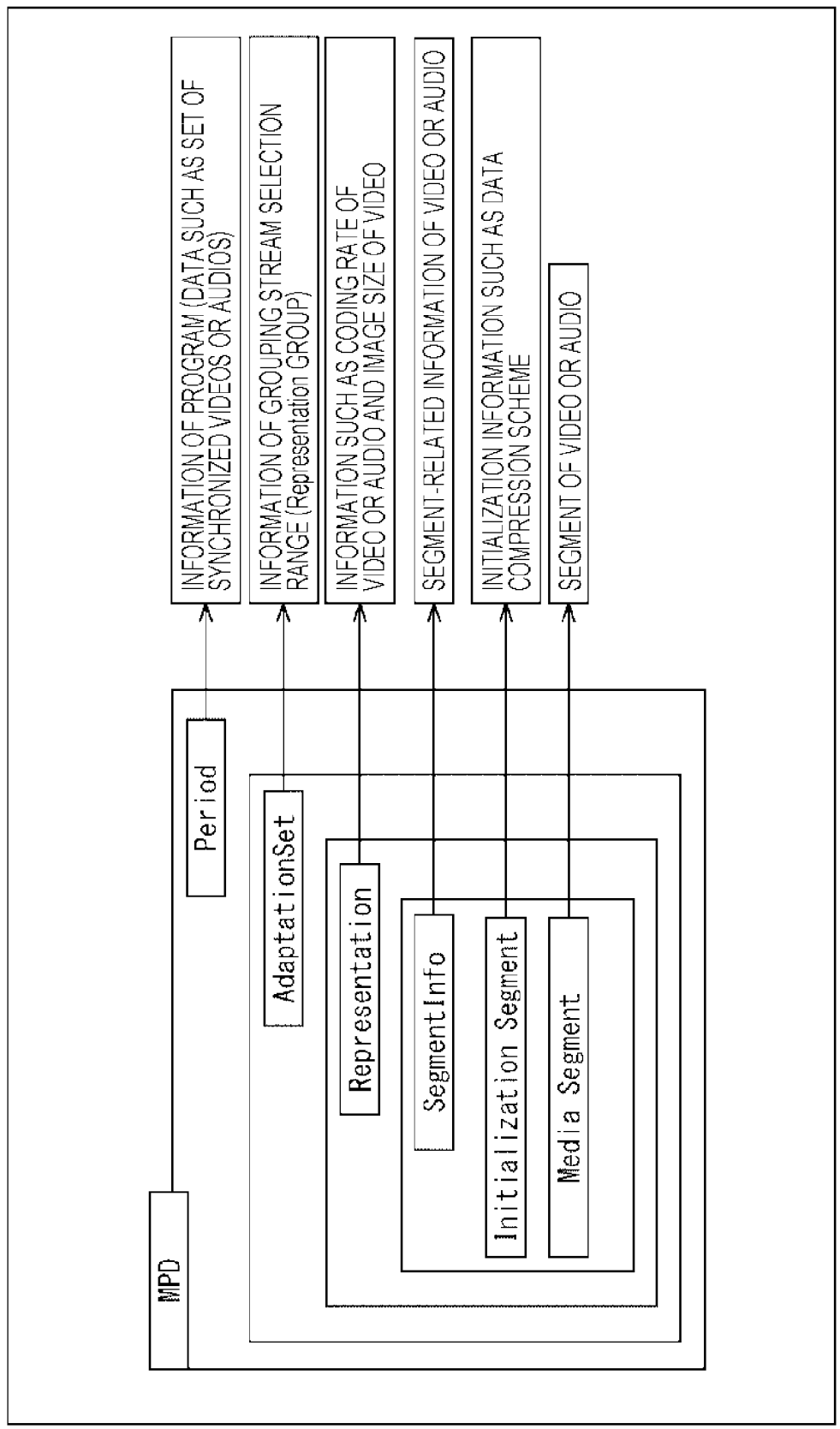
FIG. 4 is a diagram illustrating a hierarchical structure below a Period in an MPD.

FIG. 4 illustrates a hierarchical structure below the Period in the MPD. Further, the MPD is described in, for example, an XML format. An AdaptationSet which is information for grouping a Representation group serving as a stream selection range is described in a layer below the Period. A Representation including information indicating a bit rate, an angle of view size, a language, or the like of a video or an audio is described in a layer below the AdaptationSet. A Segmentinfo which is segment-related information of a video or an audio is described in a layer below the Representation. An Initialization Segment indicating initialization information such as a data compression scheme and a Media Segment indicating a data supply source of a Segment unit of a video or an audio is described in a layer below the Segmentinfo.

Figure 5:
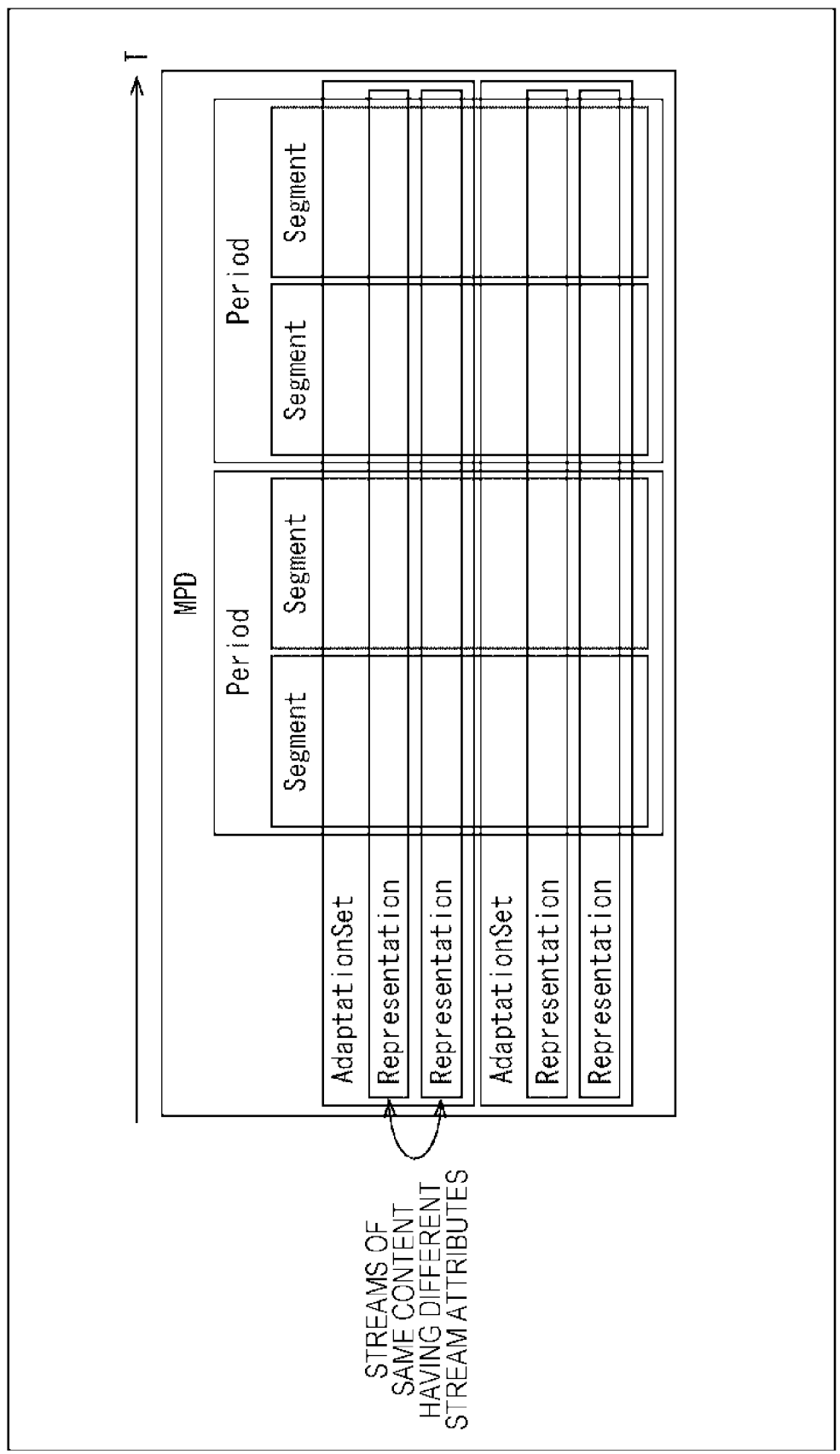
FIG. 5 is a diagram illustrating a state in which MPD structures are arranged on a time axis.

FIG. 5 illustrates a state in which MPD structures are arranged on a time axis. As is apparent from FIG. 5, segments of respective Representations having different stream attributes included in same AdaptationSet are synchronized.

The receiving side can select a Representation that is optimal for reception and reproduction on the basis of the attribute of the Representation included in the Period of the MPD, acquire the Initialization Segment from a first Segment of the selected Representation, determine a data compression scheme or the like, and then acquire and reproduce a subsequent segment.

Figure 6:
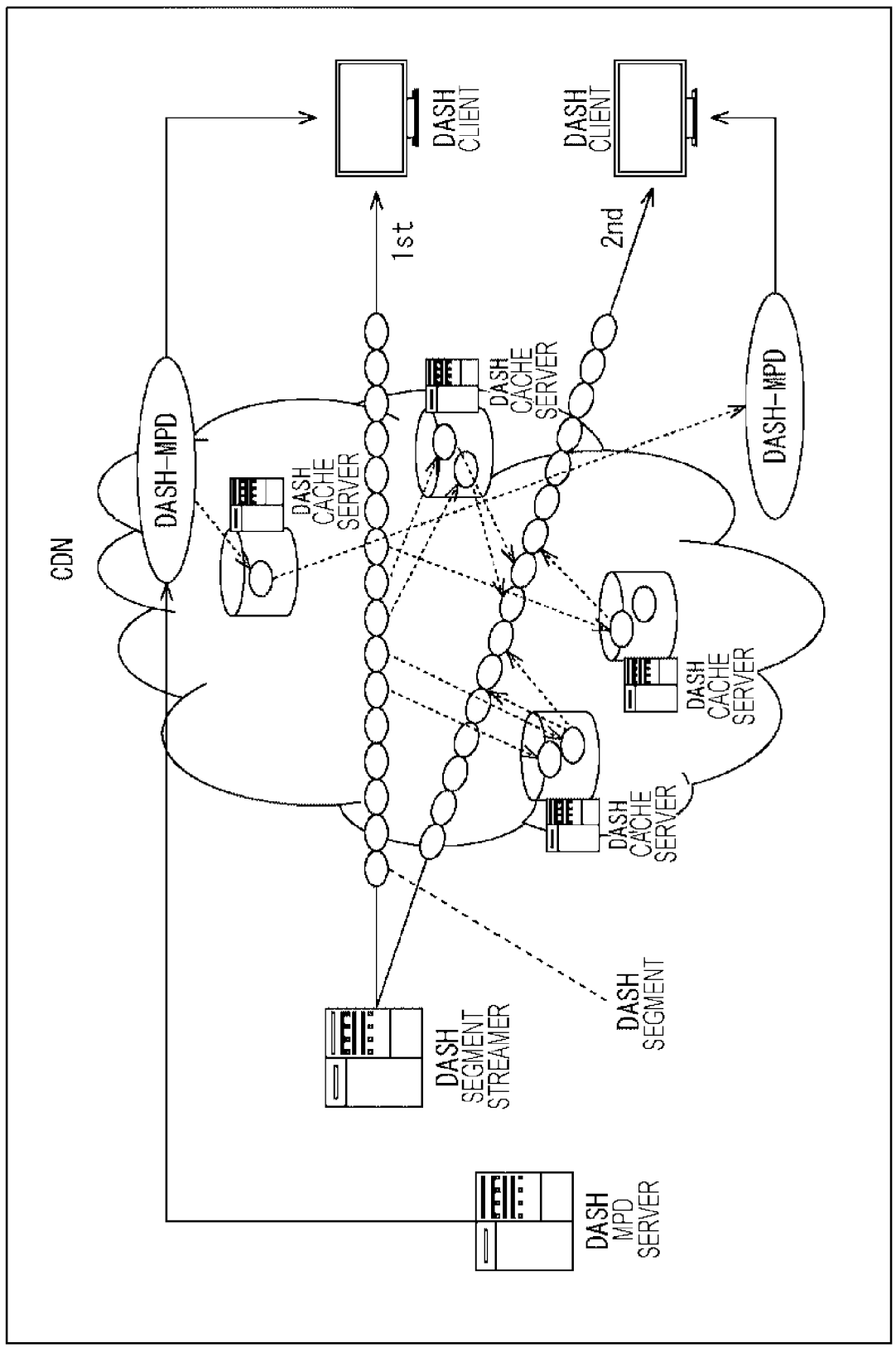
FIG. 6 is a block diagram illustrating an example of a configuration of a stream delivery system in which DASH is employed.

FIG. 6 illustrates an example of a configuration of a stream delivery system in which DASH is employed.

Figure 1:
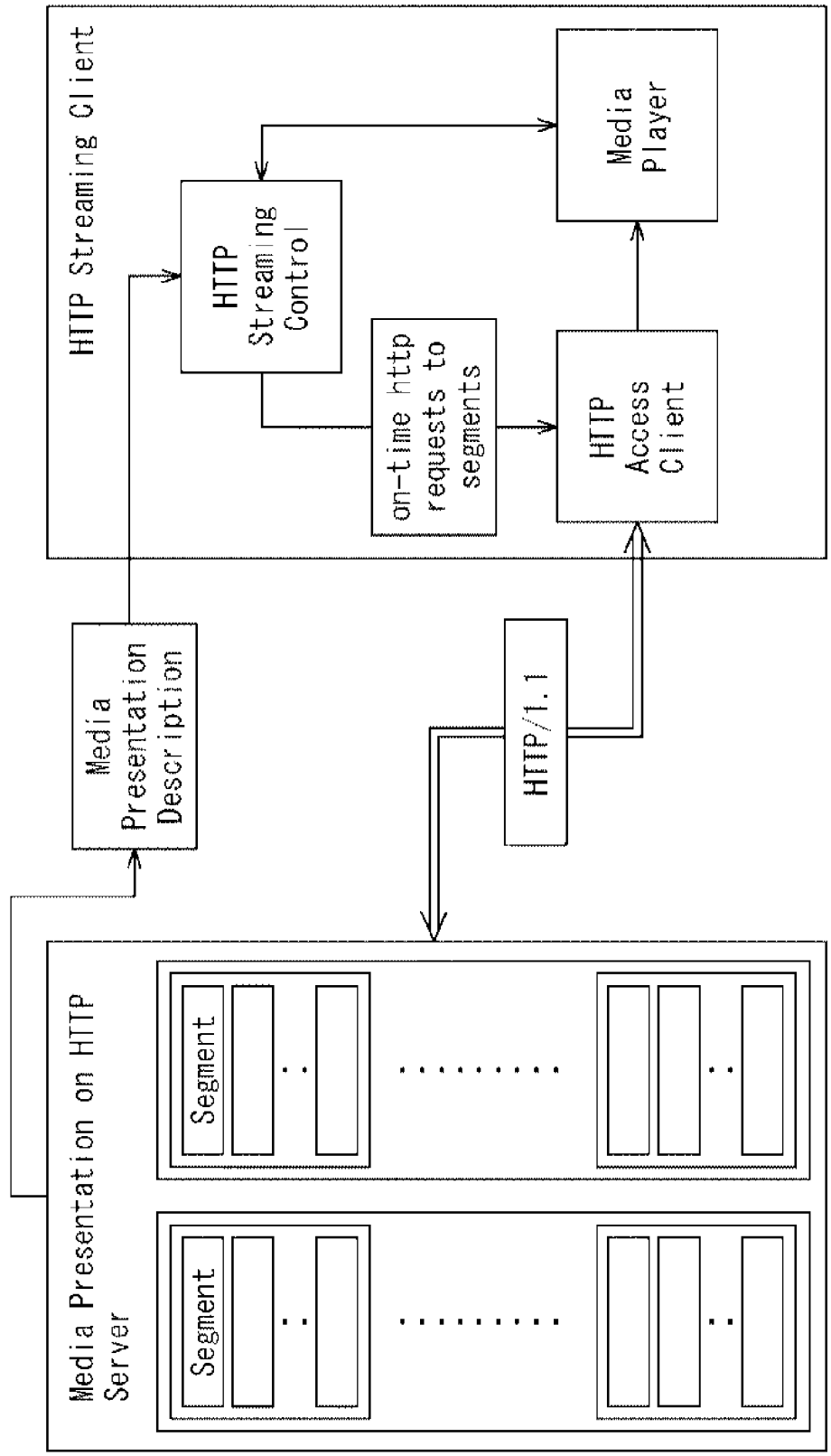
FIG. 1 is a block diagram illustrating an example of a configuration of a stream delivery system in which DASH is employed.

A DASH MPD server and a DASH segment streamer of FIG. 6 correspond to the Media Presentation on HTTP Server of FIG. 1. Further, a DASH client of FIG. 6 corresponds to the HTTP Streaming Client of FIG. 1.

The DASH MPD server, the DASH segment streamer, and the DASH client are connected via a content delivery network (CDN) formed on the Internet. A DASH cache server (proxy server) is installed in the CDN.

The DASH MPD server delivers the MPD via the CDN in response to a HTTP request from the DASH client. The DASH segment streamer delivers a segment file via the CDN in response to the HTTP request from the DASH client which has selected a stream acquisition destination with reference to the MPD.

Further, the DASH cache server monitors the CDN and temporarily caches the segment file to be delivered to the DASH client via the CDN. Then, in a case where the HTTP request requesting the segment file cached from the DASH client is transmitted to the DASH segment streamer, the DASH cache server delivers the cached segment file to the MPD client of the request source instead of the DASH segment streamer.

Further, the DASH cache server can temporarily cache not only the segment file of the stream but also MPD and supply the cached MPD to the DASH client of the request source instead of the DASH MPD server.

Since the DASH cache server is installed on the CDN, it is possible to improve the delivery efficiency of the HTTP streaming to a majority of DASH clients in the stream delivery system.

Further, the present disclosure is based on the assumption that the receiving side has a function of the DASH cache server (the details will be described later with reference to FIG. 9).

By the way, the MPD and the segment file of the stream of the content are delivered in accordance with the HTTP in a unicast manner but may be delivered in a multicast manner in which simultaneous delivery to a plurality of DASH clients can be performed.

Specifically, the MPD and the segment file of the stream of the content may be stored in, for example, an IP-based transport stack of ATSC 3.0 which is a next generation terrestrial digital television broadcast standard in the United States and delivered in a multicast manner.

Figure 7:
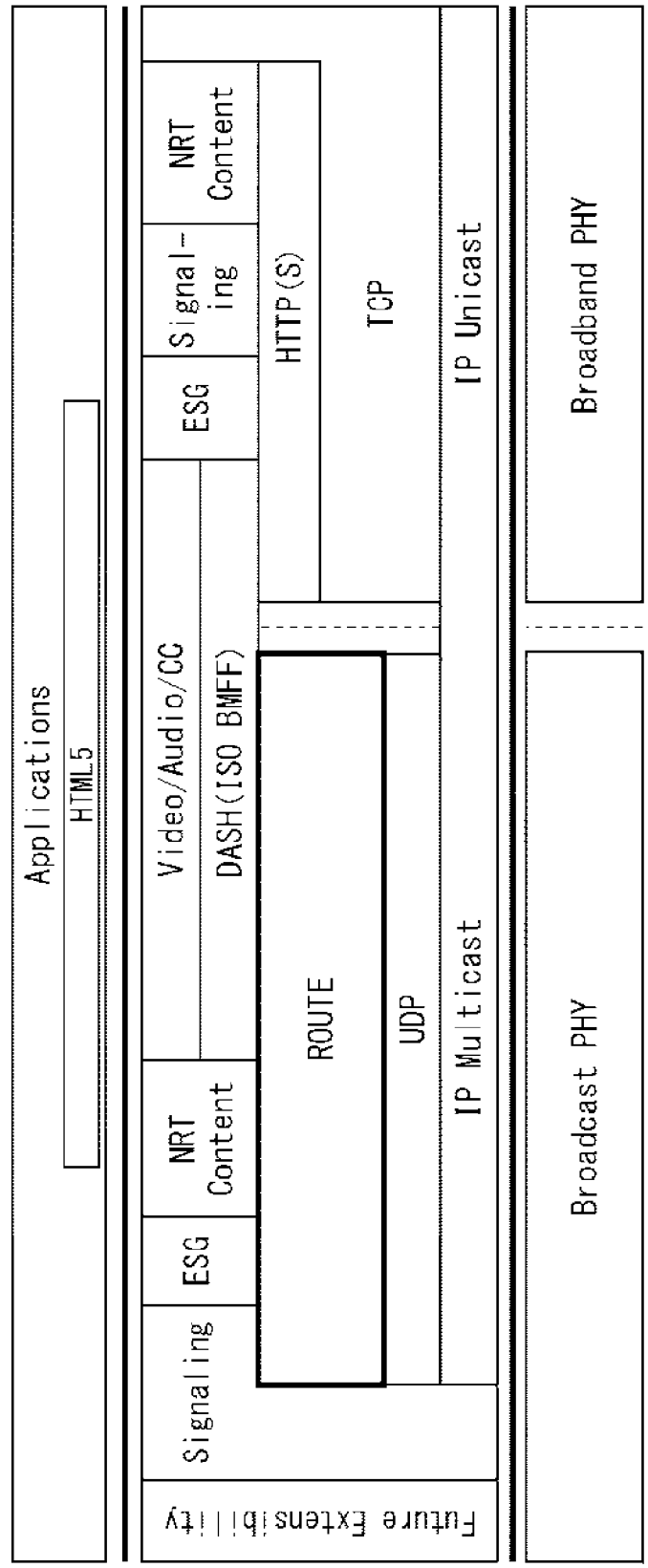
FIG. 7 is a diagram illustrating a ROUTE/DASH based stack.
Figure 8:
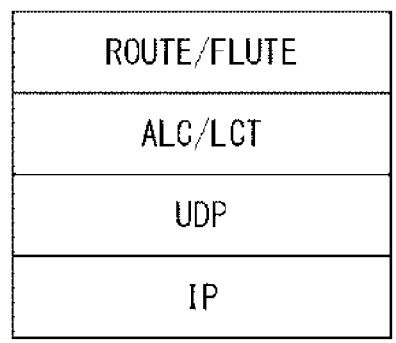
FIG. 8 is a diagram illustrating a ROUTE/DASH based stack.

FIGS. 7 and 8 illustrate a stack based on a real-time object delivery over unidirectional transport (ROUTE)/DASH which is established as a standard candidate scheme in standardization of the IP based transport stack of ATSC 3.0.

Signaling for delivery of an MPD, a segment, or a broadcast in DASH (an extended USBD/USD, an S-TSID, or the like) can be transferred in accordance with a ROUTE protocol.

The ROUTE protocol is an extension of a file delivery over unidirectional transport (FLUTE) protocol. A metadata file in which a transfer control parameter in the FLUTE protocol is described is referred to as a file delivery table (FDT), but a metadata file in which a transfer control parameter in ROUTE is described is referred to as a service based transport session description (S-TSID). Further, the S-TSID is a super-set of FDT and includes the FDT.

Configuration Example of Client Device to which Present Disclosure is Applied

Figure 9:
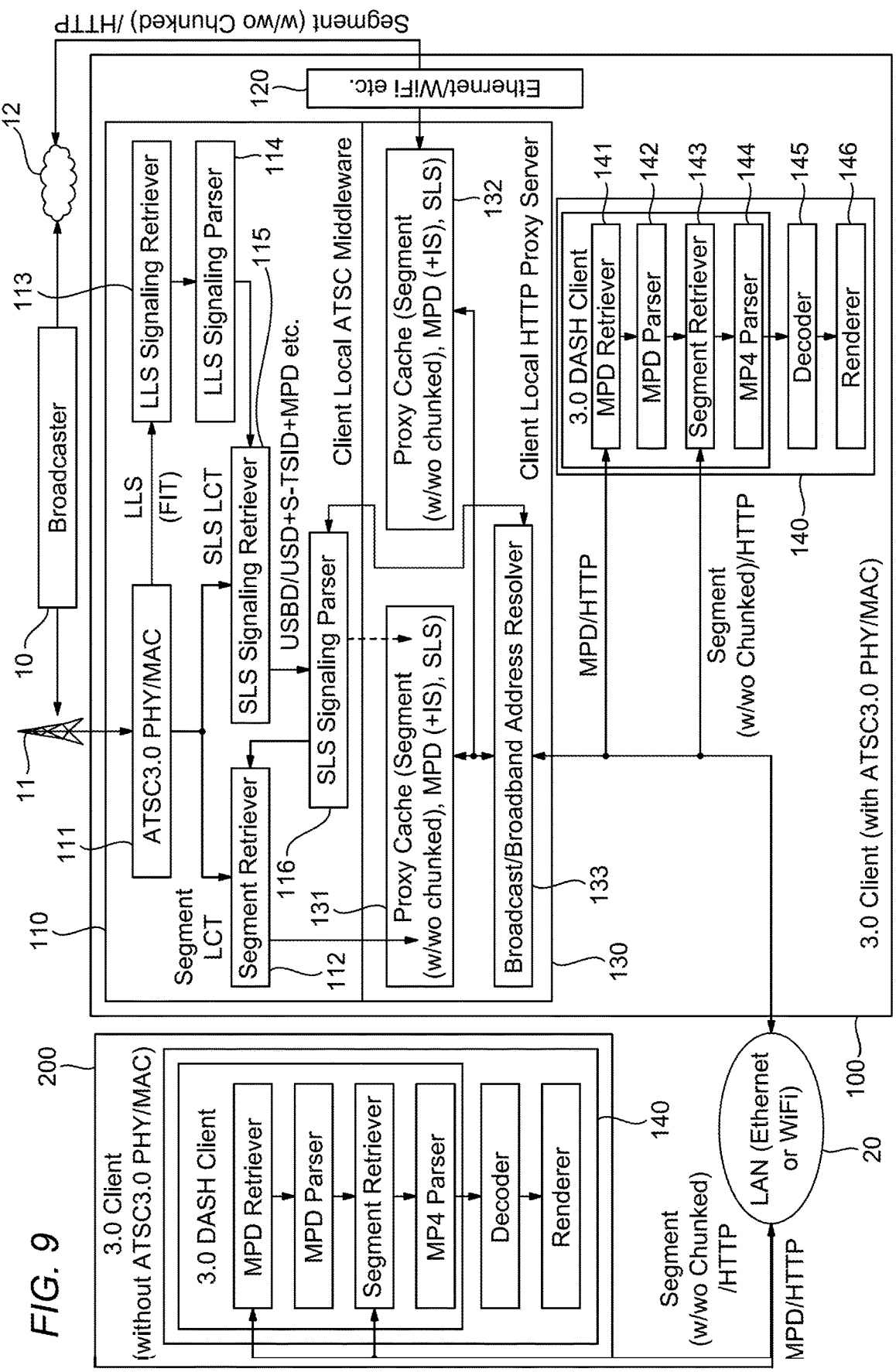
FIG. 9 is a block diagram illustrating a configuration example of a DASH client device which is an embodiment of the present disclosure.

Next, FIG. 9 illustrates a configuration example of the client device on the receiving side in a case where a streaming delivery service in which DASH is employed is implemented in ATSC 3.0.

A client device 100 is an embodiment of the receiving device which is a first aspect of the disclosure.

The client device 100 can also be applied in a case where a streaming delivery service in which DASH is employed is implemented in television broadcasting standards other than ATSC 3.0.

The client device (3.0 Client (with ATSC 3.0 PHY/MAC)) 100 is assumed to be, for example, a television receiver and the like installed in a general house or mounted in a mobile object such as an automobile.

The client device 100 includes a broadcast receiving unit (Client ATSC Middleware) 110, a communication unit (Ethernet/WiFi etc.) 120, a proxy server unit (Client Local HTTP Proxy Server) 130, and a DASH client unit (3.0 DASH Client) 140.

The broadcast receiving unit 110 includes a tuner unit 111 that receives a broadcast signal, a segment retriever 112 that extracts a segment file from a broadcast signal, an LLS signaling retriever 113 that extracts a low level signaling (LLS) file from the broadcast signal, and an LLS signaling parser 114 that analyzes an LLS file. Further, the broadcast receiving unit 110 includes an SLS signaling retriever 115 that extracts a Service Layer Signaling (SLS) file from the broadcast signal and an SLS signaling parser 116 that analyzes an SLS file.

The broadcast receiving unit 110 executes a process of receiving the MPD, the segment file of the stream, the SLS file, and the like delivered from a Broadcaster 10 (corresponding to the DASH MPD server and the DASH segment streamer in FIG. 6) via a broadcasting network 11 such as terrestrial digital broadcasting or satellite broadcasting.

A communication unit 120 executes a process of requesting the MPD, the segment file of the stream, the SLS file (transmits a HTTP request) via a CDN 12 formed in the two-way communication network such as the Internet from the Broadcaster 10 and receiving the MPD or the segment file which is HTTP-delivered in response to the request.

A proxy server unit 130 includes a proxy cache 131 that caches various kinds of files received via the broadcasting network 11, a proxy cache 132 that caches various kinds of files received via the CDN 12, and a broadcast/broadband address resolver 133 that responds to a request from a DASH client unit 140.

The broadcast/broadband address resolver 133 executes a process of supplying the MPD and the segment file cached in the proxy cache 131 or 132 in response to the request from the DASH client unit 140.

Further, the broadcast/broadband address resolver 133 performs a process of notifying the DASH client unit 140 of supply availability information indicating the reception state or the like of the segment file by the broadcast receiving unit 110 or the communication unit 120. Further, the supply availability information will be described later in detail.

The DASH client unit 140 includes an MPD retriever 141 that requests and acquires the MPD, an MPD parser 142 that analyzes the MPD, a segment retriever 143 that requests and acquires the segment file with reference to the MPD, and an MP4 parser 144 that extracts and analyzes MP4 data from the segment file. Further, the DASH client unit 140 includes a decoder 145 that decodes the MP4 data and a renderer 146 that renders a decoding result.

The DASH client unit 140 is implemented, for example, on a browser installed in the client device 100. Here, the DASH client unit 140 may be implemented not only as a browser application but also as a native application. The DASH client unit 140 executes a process of acquiring the MPD, the segment file, the SLS file, or the like received by the broadcast receiving unit 110 or the communication unit 120 via the proxy server unit 130, performing stream rendering or application control, and outputting a video and an audio of the stream to a monitor (not illustrated) at a subsequent stage.

Further, the DASH client unit 140 can be installed not only in the client device 100 but also in a client device 200 connected to the client device 100 via a LAN 20. The client device 200 is assumed to be, for example, a smartphone, a tablet, or the like.

The client device 200 is an embodiment of a reproducing device which is a second aspect of the present disclosure.

The DASH client unit 140 in the client device 200 is connected to the client device 200 via the LAN 20 and can execute a process of acquiring the MPD, the segment file, the SLS file, or the like received by the broadcast receiving unit 110 or the communication unit 120 via the proxy server unit 130 of the client device 200, performing stream rendering or application control, and outputting a video and an audio of the stream to a monitor (not illustrated) at a subsequent stage.

Further, although not illustrated, a supply device having a configuration in which the DASH client unit 140 is omitted from the client device 100 serving as an embodiment of a supply device which is a third aspect of the present disclosure is connected to the LAN 20. In this case, the client devices 100 and 200 can also request the supply device to supply the MPD, the segment file, or the like.

As described above, the DASH client unit 140 in the client device 100 and the DASH client unit 140 in the client device 200 necessarily acquire various kinds of files via the proxy server unit 130. Therefore, the DASH client unit 140 can implement so-called network transparency in which it is unnecessary to distinguish whether various kinds of files to be acquired pass through the broadcasting network 11 or the CDN 12. Therefore, since the portability of the DASH client unit 140 is enhanced, it is possible to install the DASH client unit 140 even in a device which is unable to receive a broadcast.

Next, the proxy server unit 130 will be described in detail. Upon receiving a request to acquire various kinds of files (upon receiving an HTTP request) from the DASH client unit 140, the broadcast/broadband address resolver 133 of the proxy server unit 130 determines whether various kinds of files are acquired via the broadcasting network 11 or via the CDN 12. Information which is a material of this determination is provided from the SLS signaling parser 116 of the broadcast receiving unit 110.

The SLS signaling parser 116 of the broadcast receiving unit 110 transmits a request to acquire a USBD/USD, an S-TSID, or the like which is signaling metadata of ATSC 3.0 to the SLS signaling retriever 115. The SLS signaling retriever 115 extracts the signaling metadata carried through an SLS LCT packet from the broadcast signal received by the tuner unit (ATSC 3.0 PHY/MAC) 111.

Further, the SLS signaling parser 116 also acquires the signaling metadata from a url included in a segment file acquisition request, and acquires broadcast delivery address information for acquiring a target segment file. In a case where it is known that the target segment file is delivered in a broadcast manner or has been delivered in a broadcast manner, a segment LCT packet in which the target segment file is stored is acquired from the broadcast stream on the basis of broadcast delivery address information and developed into the proxy cache 131 of the proxy server unit 130. Thereafter, the proxy server unit 130 transmits the segment file to the DASH client unit 140 as a response to the HTTP request.

In a case where the url of the requested segment file is not included in the signaling metadata, the proxy server unit 130 acquires the segment file via the communication unit 120 and expands the acquired segment file into the proxy cache 132. Thereafter, the proxy server unit 130 transmits the segment file to the DASH client unit 140 as a response to the HTTP request.

<Supply Availability Information>

Next, the supply availability information will be described. The supply availability information is an extension of a PER message to be described below.

Figure 10:
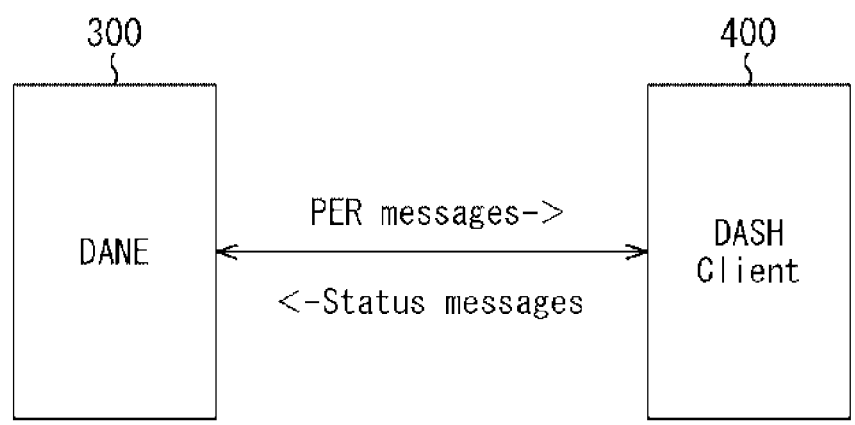
FIG. 10 is a diagram for describing a PER message.

FIG. 10 is a diagram for describing the PER message serving as the base of the supply availability information. The PER message is a message a notification of which is transmitted from a DASH-Aware Network Elements (DANE) 300 to a DASH client 400. Here, the DANE 300 corresponds to the proxy server unit 130 of the DASH client device 100 illustrated in FIG. 9. The DASH client 400 corresponds to the DASH client unit 140 of the DASH client device 100.

In DASH, a protocol called SAND is specified although it is under review. The SAND is a protocol for exchanging and supplying various real-time network environment (delivery resource) information which can be supplied from a DASH delivery component group managed by a network operator in order to effectively operate DASH.

In SAND, PER is specified as a message protocol of a message (PER message) provided from the DANE 300 to the DASH client 400. Further, Status is specified as a message protocol of a message (Status message) provided from the DASH client 400 to the DANE 300. Further, hereinafter, the PER message or the Status message is also referred to as a SAND message.

In PER, a message called ResourceStatus and a message called a DaneResourceStatus as a similar type message are defined. In the present embodiment, the ResourceStatus or the DaneResourceStatus is extended and a notification is transmitted from the proxy server unit 130 to the DASH client unit 140 as the supply availability information.

Upon receiving the ResourceStatus, the DASH client 400 can select a DASHsegment file to be requested next on the basis of the ResourceStatus. Further, since an expiration date is described in the ResourceStatus, the DASH client 400 can regard that content thereof is valid until the expiration date of the ResourceStatus.

FIG. 11 illustrates a first data structure of an extended ResourceStatus for use as the supply availability information. The first data structure designates a stream in DASH by a BaseURL element.

A BaseURL is stored in the BaseURL element as a parameter (identifier) designating a stream in DASH. Information (FIG. 12) indicating a caching state of the segment file of the stream is stored in the status element. With the status element of the supply availability information, the DASH client unit 140 which has received it can detect availability (availability) of the segment file of the stream.

FIG. 12 illustrates a specific example of information stored in the status element. "available" indicates that it is willing to receive a request for the segment file of the stream, and there is a possibility of acquisition of an expected response. "unavailable" indicates that it is not willing to receive a request for the segment file of the stream, and there is no possibility of acquisition of an expected response. "cached" indicates that the segment file of the stream is already cached and can necessarily respond.

The description returns to FIG. 11. A probability element which is an extension part is indispensable for the supply availability information, and in a case where the status element indicates available, relative reception probability to other resources whose status element indicates available is stored in the probability element. A comparison target range is assumed to be able to be decided by operational reasons.

Further, a reason element in which an arbitrary character string can be stored can be added to the supply availability information as an option, and stores reception state information (for example, a C/N value and the like) by the tuner unit 111.

Next, FIG. 13 illustrates a second data structure of the ResourceStatus expanded for use as the supply availability information. In the second data structure, the stream in DASH is designated by a RepresentationID.

The RepresentationID is stored in a repID element as a parameter (identifier) designating the stream in DASH. A status element, a probability element, and a reason element are similar to those in the first data structure, and thus description thereof is omitted.

FIG. 14 illustrates a data structure of the DaneResourceStatus expanded for use as the supply availability information.

Information (FIG. 15) indicating the caching state of the segment file of the stream designated by the URI stored in the resource element to be described next is stored in a status element. With the status element of the supply availability information, the DASH client unit 140 which has received it can detect the availability (availability) of the segment file of the stream.

FIG. 15 illustrates a specific example of information stored in the status element. "cached" indicates that the segment file of the stream is already cached and can necessarily respond. "unavailable" indicates that it is not willing to receive the segment file request of the stream, and there is no possibility of acquisition of an expected response. "unknown" indicates that it is willing to receive the segment file request of the stream, but the request is relayed to the origin server (the original DASH server), and as a result it is unable to be guaranteed whether or not an expected response can be acquired. "promised" indicates that it is willing to receive the segment file request of the stream, and there is a possibility of acquisition of a response at a time described in the MPD.

The description returns to FIG. 14. A URI indicating the stream corresponding to the state stored in the status element is stored in the resource element. A value indicating a range corresponding to the state stored in the status element among the streams indicated by the resource is stored in the byte element. Information indicating a group of resources corresponding to the state stored in the status element is stored in the resourceGroup element.

The probability element which is an extension part is indispensable for the supply availability information, and in a case where the status element indicates promised, a relative reception probability for other resources whose status element indicates promised is stored in the probability element. A comparison target range is assumed to be able to be decided by operational reasons.

Further, a reason element in which an arbitrary character string can be stored can be added to the supply availability information as an option, and stores reception state information (for example, a C/N value and the like) by the tuner unit 111.

Example of Probability Expression in Supply Availability Information

Next, an example of a probability expression in the supply availability information will be described together with an operation in a case where the SAND message serving as the supply availability information is supplied from the proxy server unit 130 to the DASH client unit 140.

Figure 16:
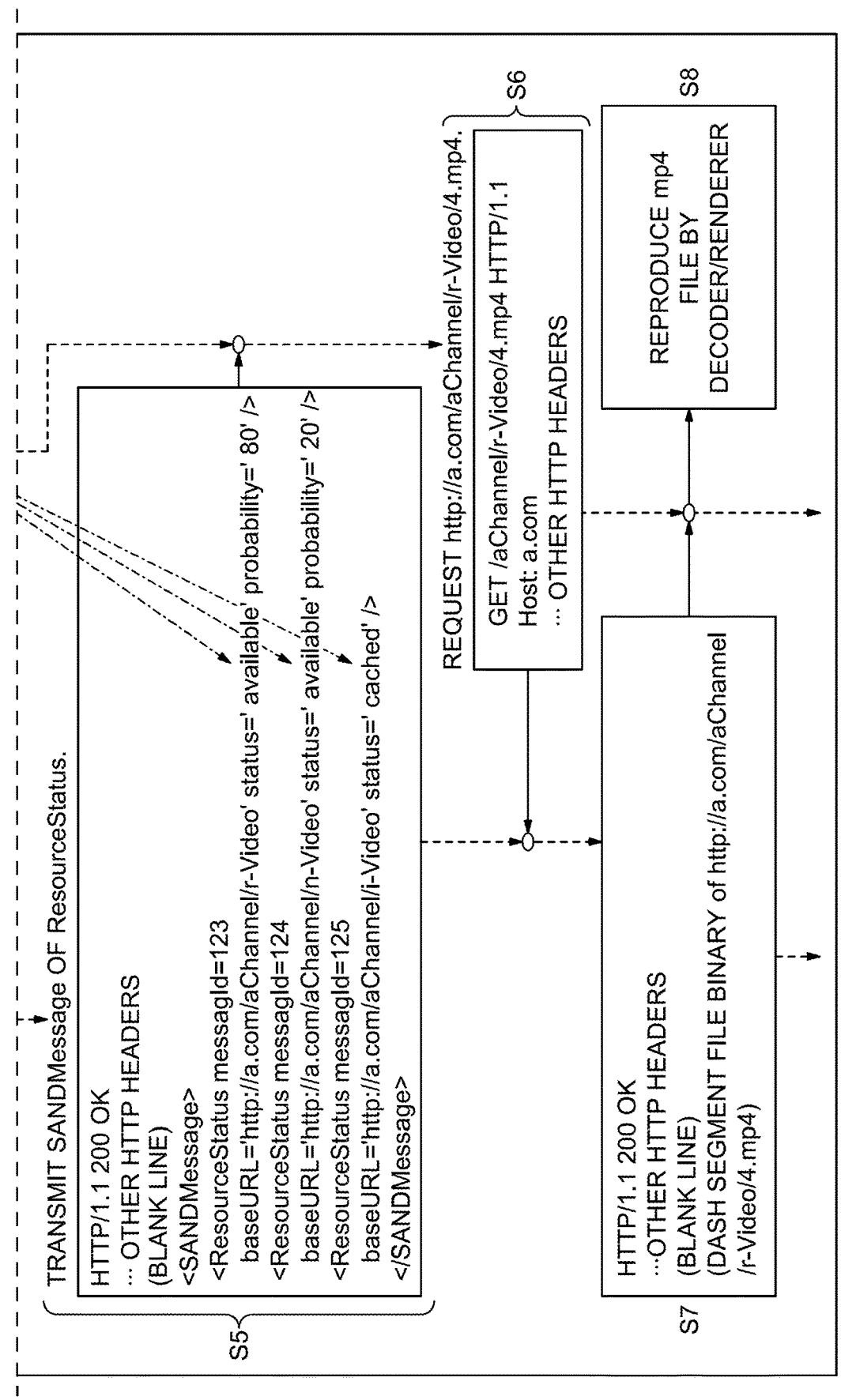
FIG. 16 is a flowchart for describing an operation in a case where supply availability information is supplied.

FIG. 16 is a flowchart for describing an operation in a case where the SAND message serving as the supply availability information is supplied from the proxy server unit 130 to the DASH client unit 140.

In step S1, the DASH client unit 140 acquires and analyzes the MPD, and transmits a segment request to supply the segment described in the MPD to the proxy server unit 130.

In step S2, the proxy server unit 130 generates the SAND message (PER message) serving as the supply availability information to be supplied to the DASH client unit 140 in accordance with the segment request from the DASH client unit 140.

More specifically, the SAND message serving as the supply availability information for each of a plurality of streams which are likely to be requested (serves as comparison targets) for a file subsequent to the segment file requested from the DASH client unit 140 is generated on the basis of recording of the segment file already cached in the proxy server unit 130 or a reception possibility estimated from the reception state of the broadcast receiving unit 110 by exchange of the request for the segment file and the response thereto (referred to as a segment file transaction) with the DASH client unit 140 which has been performed previously or a segment file transaction with the DASH client unit 140 of other DASH client devices (for example, the DASH client device 200 connected via the LAN 20).

At this time, if the proxy server unit 130 detects the MPD supplied to the DASH client unit 140 in the past, the requested segment file is compared with the BaseURL listed in the MPD, a segment sequence which is likely to be requested thereafter is narrowed down, and the relative reception probability for it is described in the SAND message.

Further, the proxy server unit 130 stores a url at which the generated SAND message is stored in the header of the response to the segment request and transmits the response. Binary data (mp4 file) of the requested segment file is stored in a body of the response.

In step S3, the DASH client unit 140 decodes an mp4 file stored in the body of the received response, performs rendering, and reproduces the requested stream. Next, in step S4, the DASH client unit 140 requests the proxy server unit 130 to transmit the SAND message serving as the supply availability information on the basis of the url stored in the header of the received response.

In step S5, in response to this request, the proxy server unit 130 transmits the SAND message serving as the supply availability information generated in step S2.

In step S6, the DASH client unit 140 selects the stream to be requested thereafter on the basis of the relative reception probability stored therein with reference to the probability or the like of the SAND message serving as the received supply availability information, and transmits the segment request corresponding to the selection to the proxy server unit 130.

In step S7, in response to the segment request from the DASH client unit 140, the proxy server unit 130 supplies the response in which the binary data (mp4 file) of the requested segment file is stored in the body to the DASH client unit 140 of the request source. In step S8, the DASH client unit 140 decodes the mp4 file stored in the body of the received response, performs rendering, and reproduces the requested stream.

Further, the proxy server unit 130 may generate a SAND message as the supply availability information each time the proxy server unit 130 receives the segment request from the DASH client unit 140 or may generate the SAND message each time the segment request is received a predetermined number of times.

Further, in the operation example of FIG. 16, the DASH client unit 140 first requests a low resolution i-Video stream, and as three types of streams (r-Video (middle resolution), n-Video (high resolution), i-Video (low resolution)) are selected as comparison targets in the SAND message serving as the supply availability information. The statuses of the r-Video and the n-Video among the streams are available, and the relative reception probabilities thereof are assumed to be 80% and 20%, respectively. Further, the status of the i-Video is cached.

Here, for example, in a case where the DASH client unit 140 is set to place a significance on both the resolution and the robustness, the DASH client unit 140 which has acquired the supply availability information can change the reception target from a stream of a low-quality i-Video to a stream of an intermediate quality r-Video which is not cached yet but has a high relative reception probability and transmit the segment request.

<Reason Element of Supply Availability Information>

Figure 17:
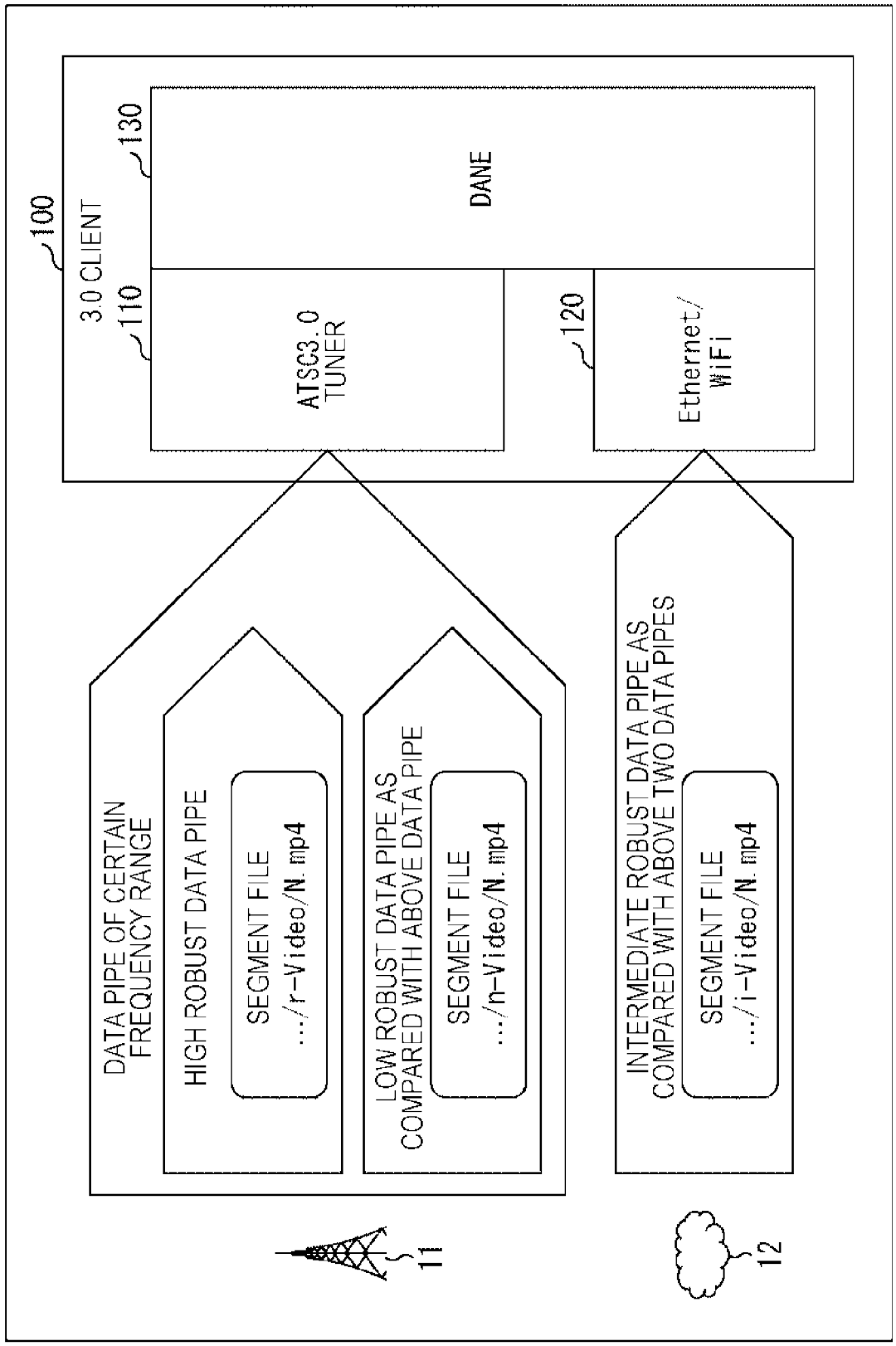
FIG. 17 is a diagram illustrating an example of supply availability information in which a reason element of option is described.

Next, FIG. 17 illustrates another example of the SAND message serving as the supply availability information, and illustrates a case where the reception state information of the tuner unit 111 is stored in the reason element describable as option.

A set of SchemeIdUri (required) and Value (optional) is stored in a reason element as a data structure. In the SchemeIdUri, a URI identifying metrics indicating the reception state is designated, and content of a value designated by the URI can be described in a value.

For example, representative metrics of metrics indicating a physical layer signal quality of terminals of broadcasting or mobile phones include metrics related to a radio field strength and metrics related to a bit error rate (BER).

Examples of the radio field strength include a carrier-to-noise ratio (C/Nratio), a received signal strength, and the like. Examples of the bit error rate include a bit error rate (a BER before/after RS) before/after an error correction process (depending on a broadcast/communication scheme) such as Reed-Solomon (RS), an error rate (BLER) of transport blocks, and the like.

In a case where the C/N ratio among them is used as a state information index, as schemeIdUri='urn:CarrierToNoiseRatio' (an identifier indicating C/N. Metrics designated in various standard specifications (to be described later) can be uniquely specified)

a value thereof is described as follows:

value='10 db' (C/N ratio value 10 dB)

Further, a character string obtained by encoding a character string having a structure starting from an element called a ReceptionQuality by a base 64 scheme is stored in the reason element as follows. It is extended to be able to store a value attribute corresponding to a schemeIdUri attribute in a ReceptionQuality element. Reason='row of (<ReceptionQuality schemeIdUri='urn:CarrierToNoiseRatio' value='10db'/> encoded by the base 64 scheme)

Specifically, it is described as follows:

Reason='PFJlY2VwdGlvblF1YWxpdHkgc2NoZW11
SWRVcmk94oCZIHVybjpDYXJy
aWVyVG9Ob2lzZVJhdGlv4oCZIHZhbHVlPeKAmTE
wZGLigJkvPg=='

Since the quality is described as a name and a value of specific metrics as described above, the DASH client unit 140 which can interpret the content of the reason element can give an instruction to acquire a subsequent segment file sequence from a plurality of paths in accordance with its determination criterion (in accordance with, for example, the reception state information of a near future estimated from transition of values of the metrics stored in the reason element of the supply availability information arranged in chronological order in addition to the relative reception probability stored in the probability element).

A specific example of metrics indicating the physical layer signal quality will be described below.

DVB Satellite Broadcast/Cable/TV Common Metrics

ETSI TR 101 290 V1.2.1 (2001-05), "Digital Video Broadcasting (DVB); Measurement guidelines for DVB systems"

DVB Satellite Broadcast Metrics

ETSI TR 101 290 V1.2.1 (2001-05), "Digital Video Broadcasting (DVB); Measurement guidelines for DVB systems"

Terrestrial Broadcasting (DVB-T2) Metrics

DVBBlueBookA14-2 (07/12), "Digital Video Broadcasting (DVB); Measurement guidelines for DVB systems; Amendment for DVB-T2 System"

Cable TV (DVB-C2) Metrics

DVBBlueBookA14-3 (03/13), "Digital Video Broadcasting (DVB); Measurement guidelines for DVB systems; Amendment for DVB-C2 System"

LTE (E-UTRA) Terminal Metrics

ETSI TS 136 214 V11.1.0 (2013-02); "LTE; Evolved Universal Terrestrial Radio Access (E-UTRA); Physical layer; Measurements (3GPP TS 36.214 version 11.1.0 Release 11)"

In order to specify the name of the metrics, for example, the value is stored in the value as schemeIdUri="urn:ETSI-TR-101-290-V1-2-1-Measurement-guidelines-for-DV B-systems:BER-before-RS-decoder in the case of the metrics specified in 6.3 BER before RS decoder of the DVB satellite broadcast/cable/television common metrics (ETSI TR 101 290 V1.2.1 (2001-05), "Digital Video Broadcasting (DVB); Measurement guidelines for DVB systems").

Configuration Example of PHY/MAC Layer Implemented in DANE

Figure 18:
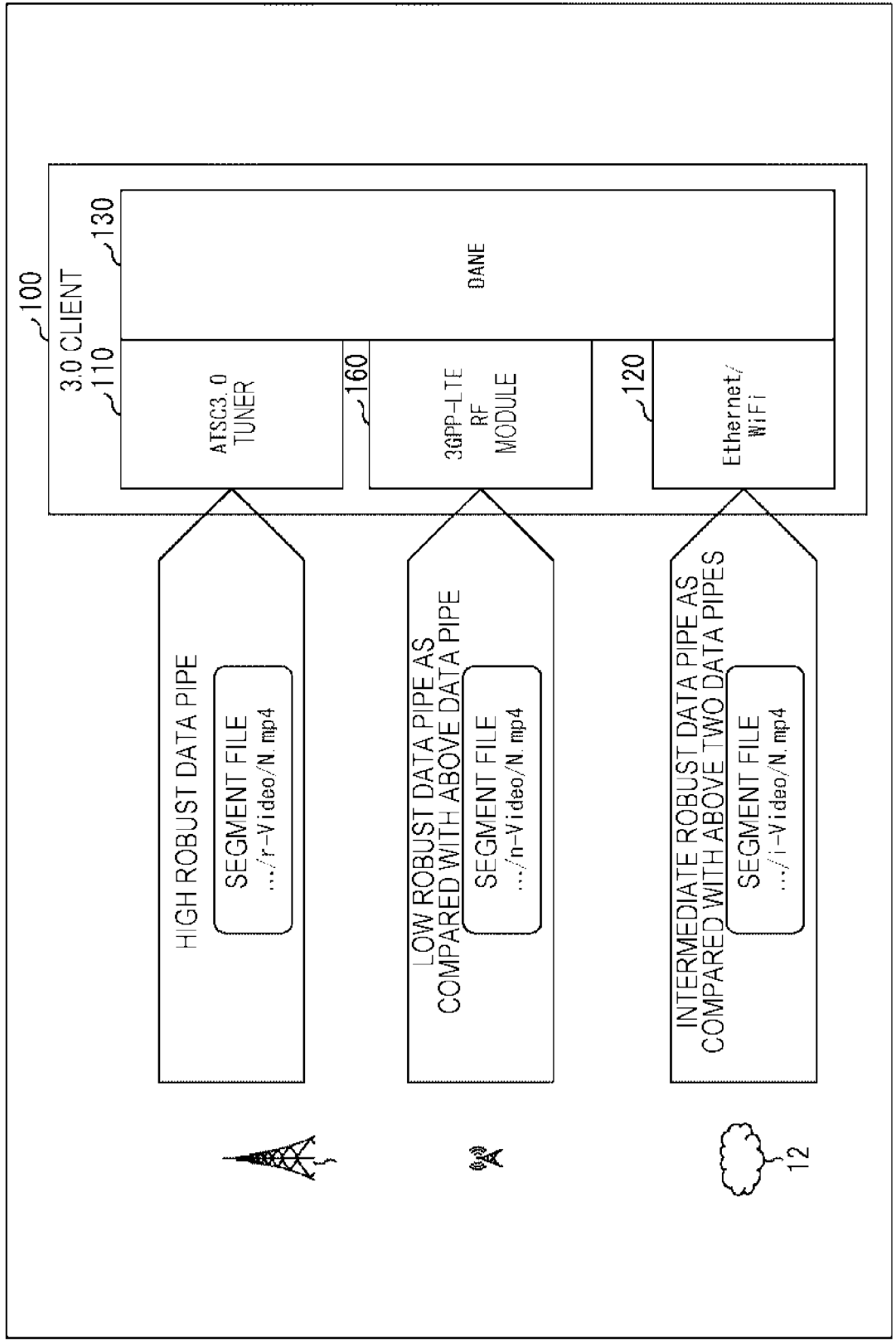
FIG. 18 is a diagram illustrating a first configuration example of PHY/MAC layer connected to DANE.

FIG. 18 illustrates a first configuration example of a PHY/MAC layer serving as a network module connected to the DANE (proxy server unit 130) which generates and supplies the SAND message illustrated in FIG. 17.

In the first configuration example, the broadcast receiving unit 110 and the communication unit 120 are connected to DANE as the PHY/MAC Layer.

The broadcast receiving unit 110 in the first configuration example can receive the segment file from two types of data pipes having different transfer reliability (a high robust data pipe and a low robust data pipe) among data pipes provided by a predetermined frequency band of ATSC 3.0 broadcast waves.

The communication unit 120 can receive the segment file from a medium robust data pipe established on the CDN 12 formed on the Internet connected by Ethernet, WiFi, or the like.

Figure 19:
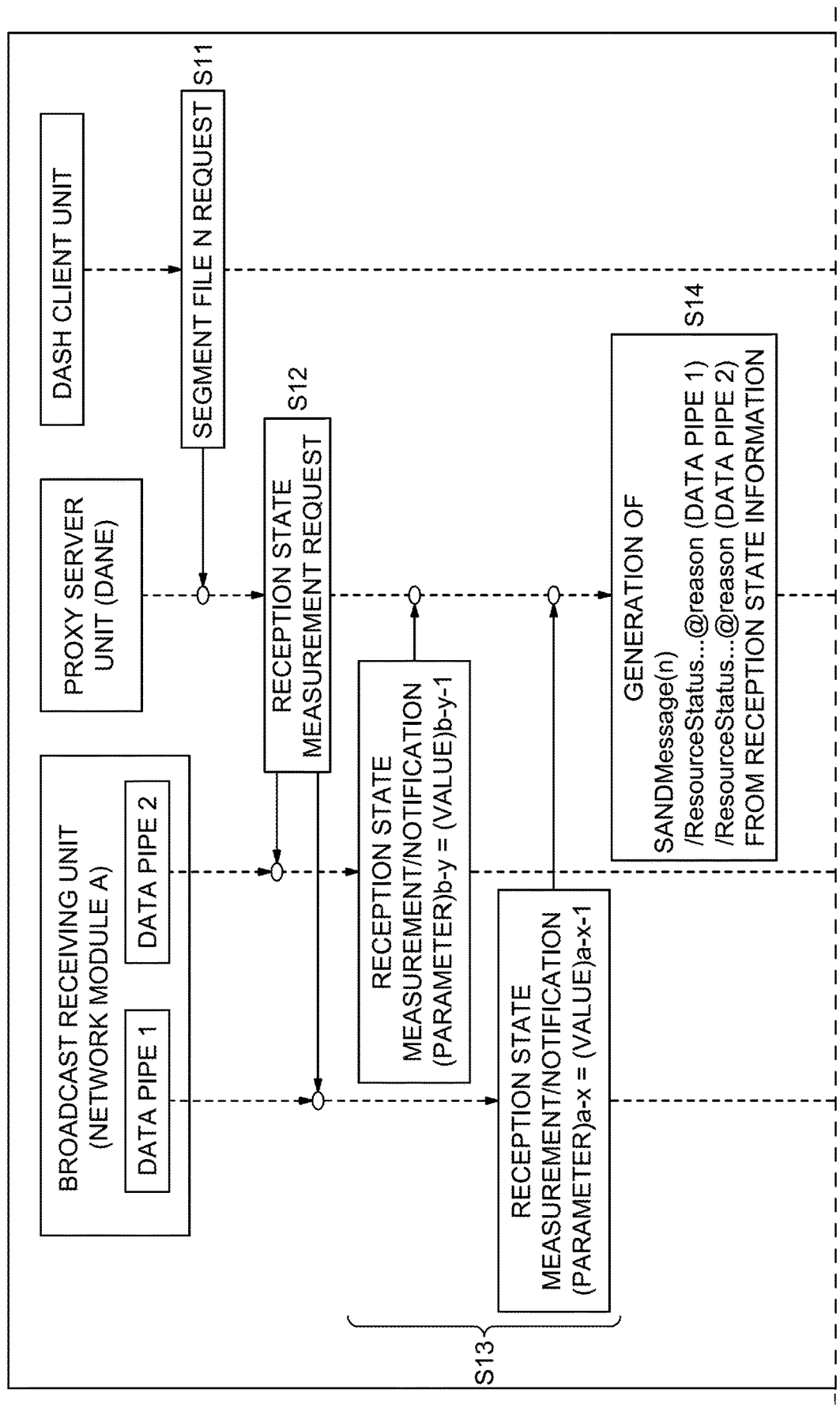
FIG. 19 is a diagram illustrating a second configuration example of a PHY/MAC layer connected to DANE.

FIG. 19 illustrates a second configuration example of the PHY/MAC layer serving as a network module connected to the DANE (the proxy server unit 130) which generates and supplies the SAND message illustrated in FIG. 17.

In the second configuration example, the broadcast receiving unit 110, the communication unit 120, and a mobile communication unit (3GPP-LTE RF module) 160 are connected to the DANE as the PHY/MAC layer.

The broadcast receiving unit 110 in the second configuration example can receive the segment file from the high robust data pipe among the data pipes provided by a predetermined frequency band of ATSC 3.0 broadcast waves.

The mobile communication unit 160 receives the segment file from the low robust data pipe present in the broadcast transport session provided by a 3GPP-multimedia broadcast/multicast service (MBMS) protocol on a channel connected with a base station of 3GPP-LTE of a mobile telephone communication network.

The communication unit 120 can receive the segment file from the medium robust data pipe established on the CDN 12 formed on the Internet connected by Ethernet, WiFi, or the like.

<Process of Generating SAND Message Serving as Supply Availability Information Including Reason Element>

Next, a process in which the proxy server unit 130 (DANE) generates the SAND message including the reason element serving as the supply availability information on the basis of information from the network module will be described.

Figure 20:
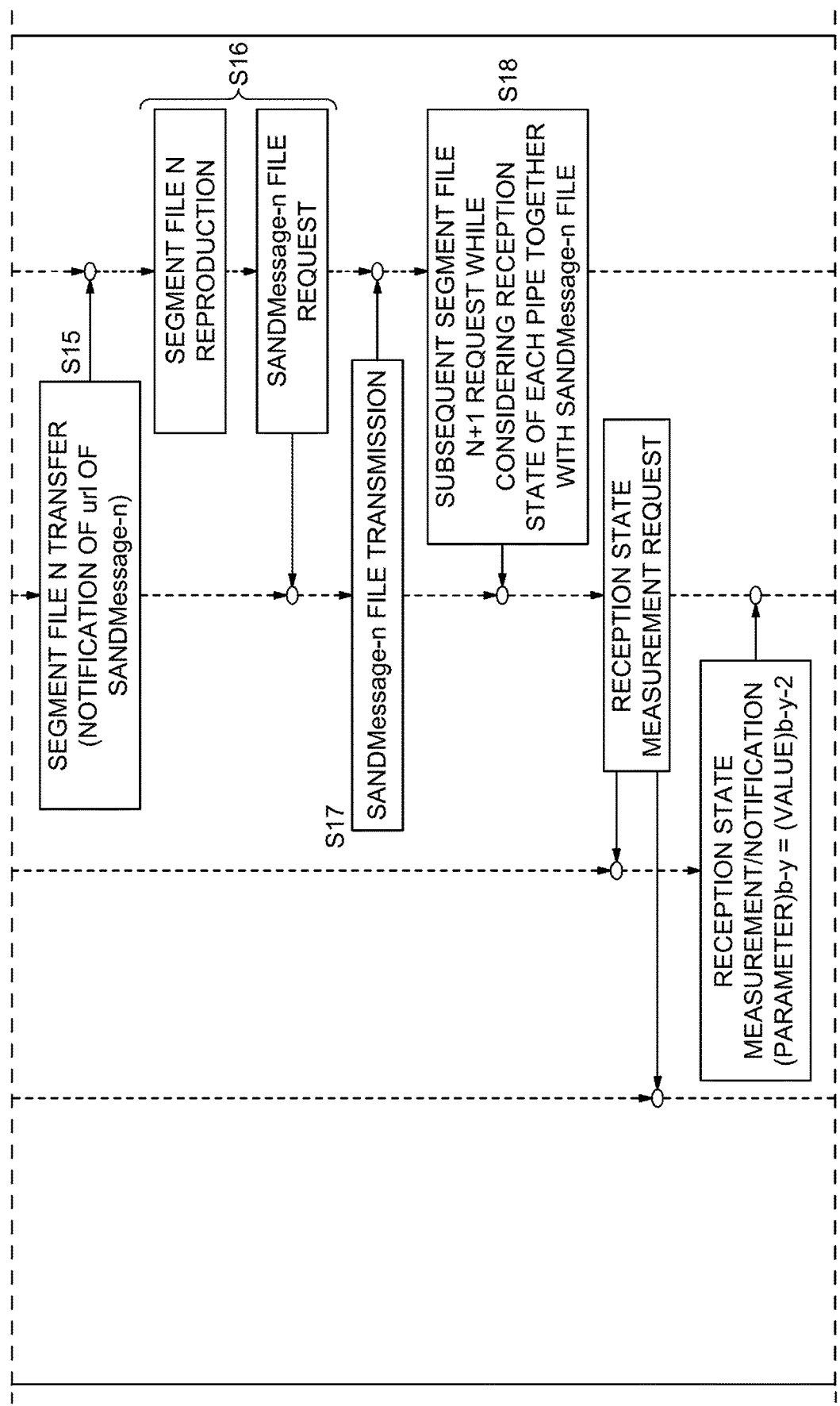
FIG. 20 is a flowchart describing a process of generating a SAND message in a case where a single network module includes two types of data pipes.
Figure 20:
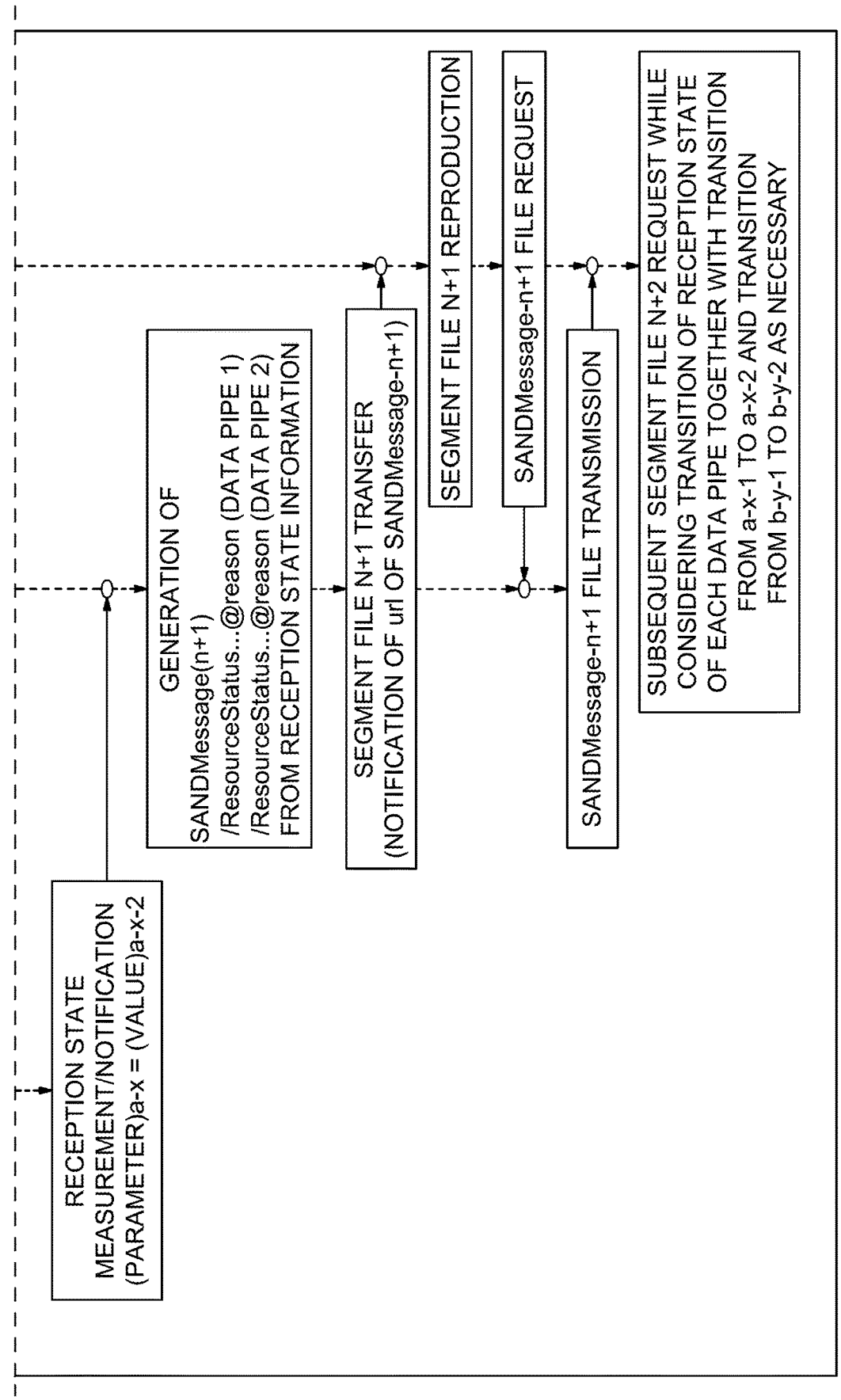

FIG. 20 is a flowchart for describing a process of generating the SAND message including the reason element serving as the supply availability information in a case where the network module is the broadcast receiving unit 110 including two types of data pipes having different transfer reliability (a high robust data pipe and a low robust data pipe) illustrated in FIG. 18.

In step S11, the DASH client unit 140 analyzes the already acquired MPD and transmits the segment request to the proxy server unit 130, and in step S12, the proxy server unit 130 requests the broadcast receiving unit 110 to measure the reception state. In response to this request, in step S13, the broadcast receiving unit 110 measures the reception state in each data pipe and notifies the proxy server unit 130 of the measurement result.

Upon receiving the notification, in step S14, the proxy server unit 130 generates the SAND message serving as the supply availability information in which the reception state of each data pipe is described in the reason element. In step S15, the proxy server unit 130 transmits a response in which the url at which the generated SAND message is stored is stored in the header of the response to the segment request, and the binary data (mp4 file) of the requested segment file is stored in the body to the DASH client unit 140.

In step S16, the DASH client unit 140 decodes the mp4 file stored in the body of the received response, performs rendering, and reproduces the requested stream. Further, the DASH client unit 140 requests the proxy server unit 130 to transmit a SAND message serving as the supply availability information on the basis of the url stored in the header of the received response.

In response to this request, in step S17, the proxy server unit 130 transmits the SAND message serving as the supply availability information generated in step S14.

In step S18, the DASH client unit 140 selects the stream to be requested thereafter with reference to the received SAND message serving as the supply availability information, and transmits the segment request corresponding to the selection to the proxy server unit 130. Thereafter, the process starting from step S12 described above is repeated.

Further, the DASH client unit 140 which has received the chronological supply availability information can select the stream to be requested thereafter on the basis of the transition of the reception state of the same data pipe or the like.

Figure 21:
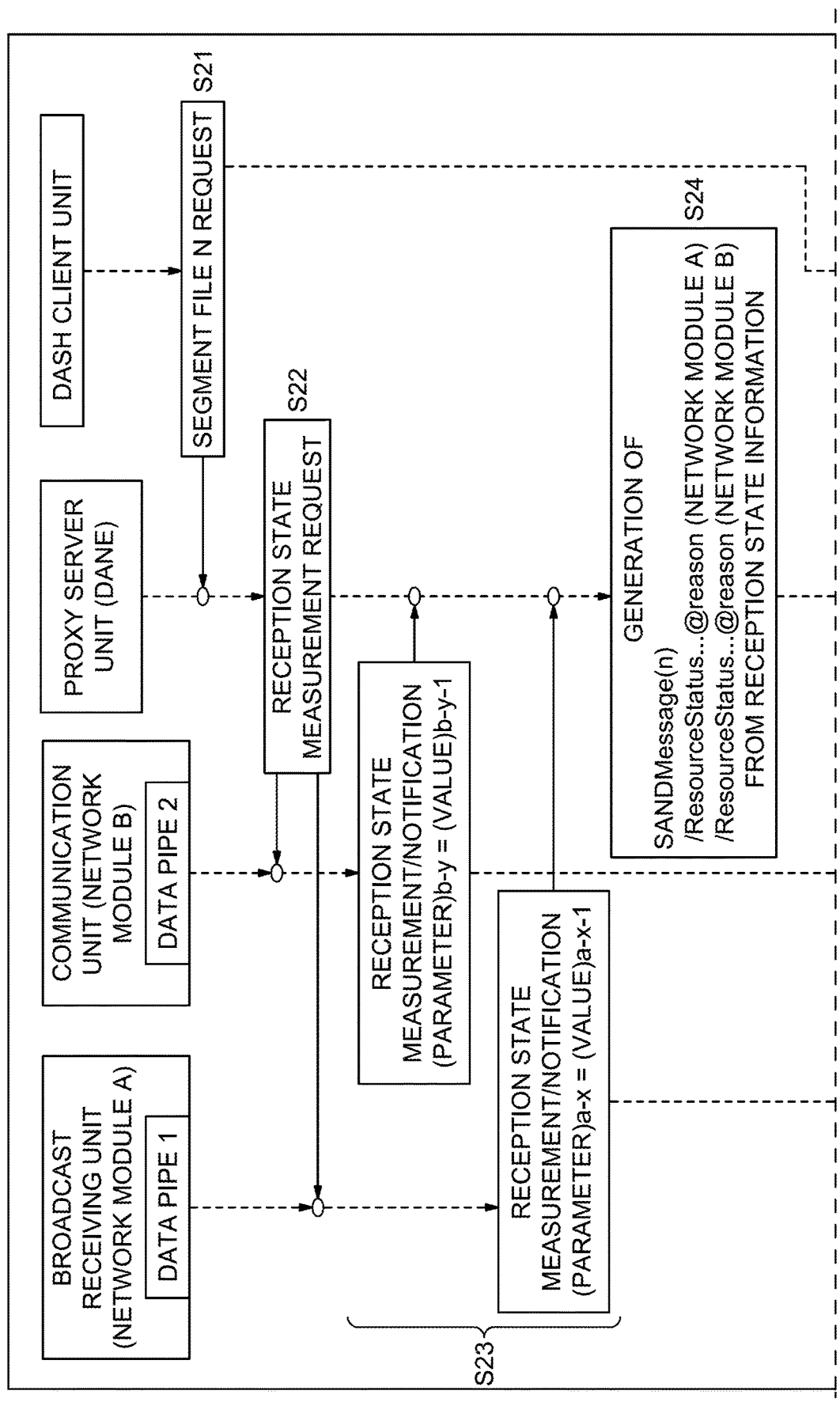
FIG. 21 is a flowchart describing a process of generating a SAND message in a case where there are two types of network modules.
Figure 21:
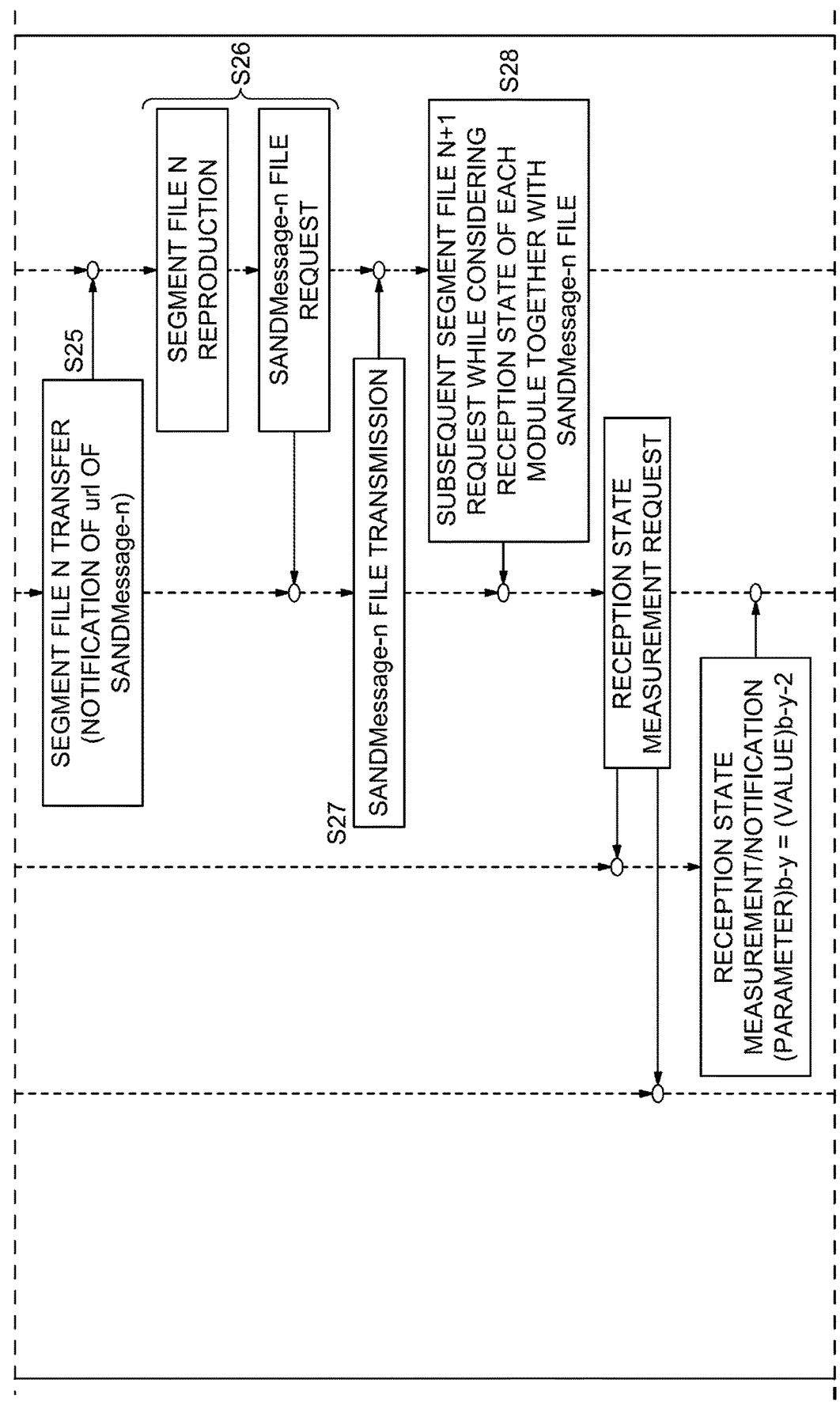

Next, FIG. 21 is a flowchart for describing a process of generating the SAND message including the reason element serving as the supply availability information in a case where the network module is the broadcast receiving unit 110 and the communication unit 120 each including one type of data pipe illustrated in FIG. 19.

In step S21, the DASH client unit 140 analyzes the already acquired MPD and transmits the segment request to the proxy server unit 130, and in step S22, the proxy server unit 130 requests the broadcast receiving unit 110 and the communication unit 120 to measure the reception state. In response to this request, in step S23, the communication unit 120 measures the reception state in its own data pipe and notifies the proxy server unit 130 of the measurement result. Similarly, the broadcast receiving unit 110 measures the reception state of its own data pipe and notifies the proxy server unit 130 of the measurement result.

Upon receiving the notification, in step S24, the proxy server unit 130 generates the SANDmessage serving as the supply availability information in which the reception state of each data pipe is described in the reason element. In step S25, the proxy server unit 130 transmits a response in which the url at which the generated SAND message is stored is stored in the header of the response to the segment request, and the binary data (mp4 file) of the requested segment file is stored in the body to the DASH client unit 140.

In step S26, the DASH client unit 140 decodes the mp4 file stored in the body of the received response, performs rendering, and reproduces the requested stream. Further, the DASH client unit 140 requests the proxy server unit 130 to transmit the SAND message serving as the supply availability information on the basis of the url stored in the header of the received response.

In response to this request, in step S27, the proxy server unit 130 transmits the SAND message serving as the supply availability information generated in step S24.

In step S28, the DASH client unit 140 selects the stream to be requested thereafter with reference to the received SAND message serving as the supply availability information, and transmits the segment request corresponding to the selection to the proxy server unit 130. Thereafter, the process starting from step S22 described above is repeated.

Further, the DASH client unit 140 which has received the chronological supply availability information can select the stream to be requested thereafter on the basis of the transition of the reception state of the same data pipe or the like.

Figure 22:
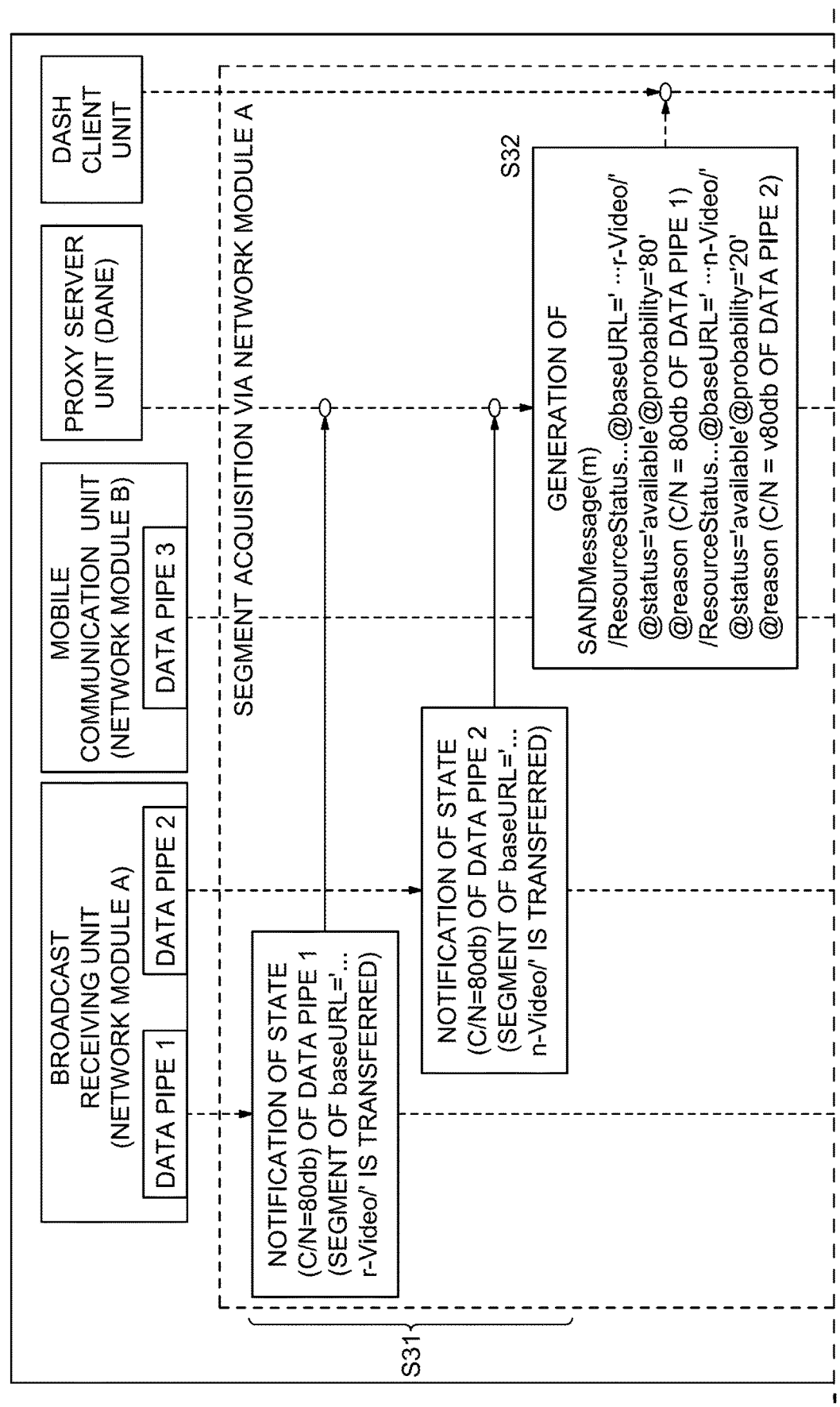
FIG. 22 is a flowchart for describing a process of generating a SAND message in a case where an inactive network module is present in normal circumstances.
Figure 22:
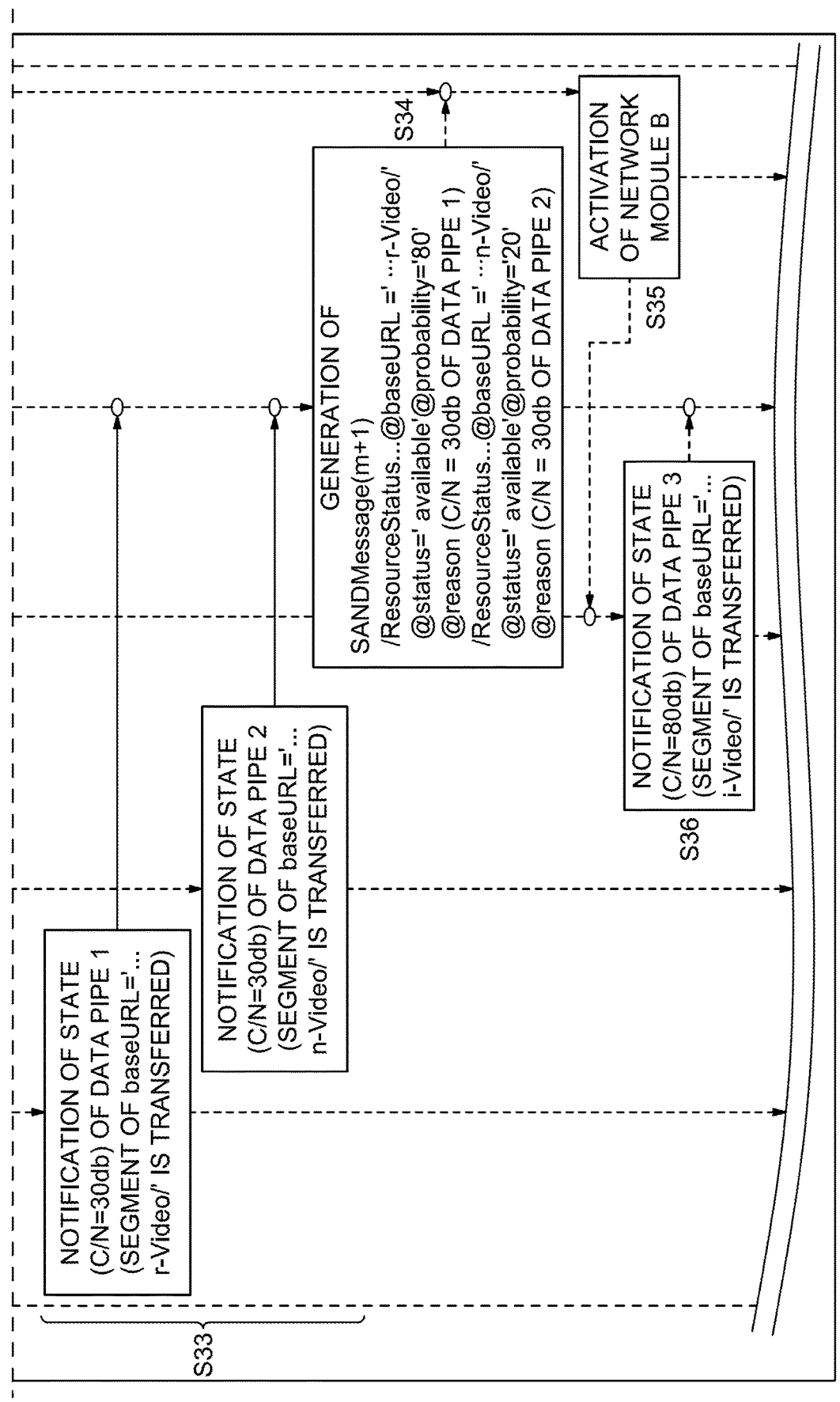
Figure 23:
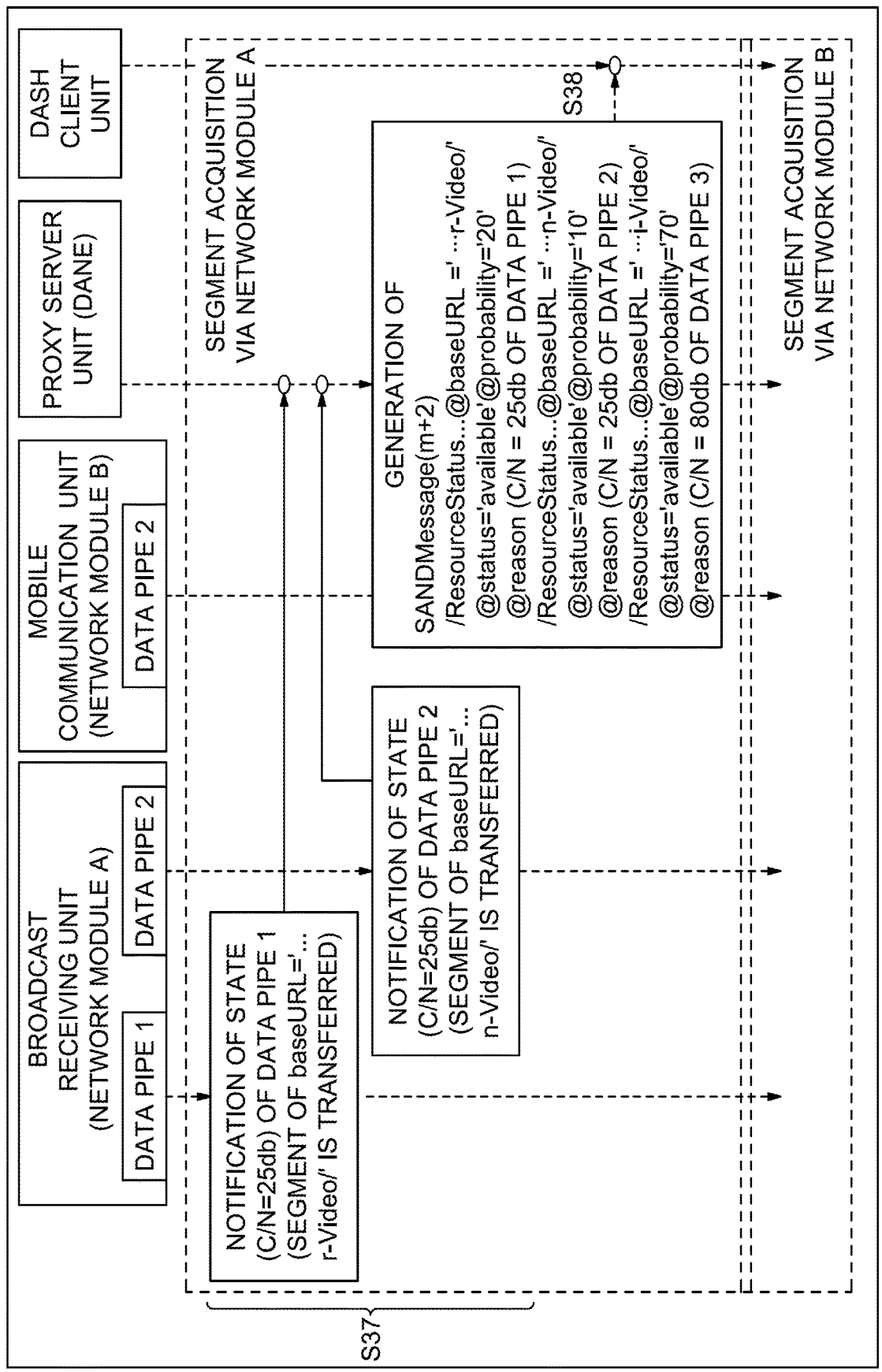
FIG. 23 is a flowchart for describing a process of generating a SAND message in a case where an inactive network module is present in normal circumstances.

Next, FIGS. 22 and 23 are flowcharts for describing a process of generating the SAND message including the reason element serving as the supply availability information in a case where the network module is the broadcast receiving unit 110 which consistently have two types of active data pipes having different transfer reliabilities and the mobile communication unit 160 which has an inactive data pipe in normal circumstances due to reasons of meter rate charging or the like, for example.

The DASH client unit 140 analyzes the already acquired MPD and transmits the segment request to the proxy server unit 130, and then the proxy server unit 130 requests the broadcast receiving unit 110 to measure the reception state. In response to this request, in step S31, the communication unit 120 measures the reception state in each of the two types of data pipes and notifies the proxy server unit 130 of the measurement result.

Upon receiving this notification, in step S32, the proxy server unit 130 generates the SANDmessage serving as the supply availability information in which the reception state of each data pipe is described in the reason element, and transmits a response in which the url at which the generated SAND message is stored is stored in the header of the response to the segment request, and the binary data (mp4 file) of the requested segment file is stored in the body to the DASH client unit 140.

Upon receiving an n-th response, the DASH client unit 140 decodes the mp4 file stored in the body, performs rendering, reproduces the requested stream, and requests the SAND message serving as the supply availability information on the basis of the url stored in the header thereof. In response to this request, the proxy server unit 130 transmits the SAND message serving as the supply availability information generated in step S32.

Upon receiving the SAND message, the DASH client unit 140 selects the stream to be requested thereafter with reference to the SAND message serving as the supply availability information, and transmits the segment request corresponding to the selection to the proxy server unit 130, and then a process of steps S33 and S34 similar to the process of steps S31 and S32 is performed.

Upon receiving the (n+1)-th response, the DASH client unit 140 decodes the mp4 file stored in the body thereof, performs rendering, reproduces the requested stream, and requests the SAND message serving as the supply availability information on the basis of the url stored in the header thereof. In response to this request, the proxy server unit 130 transmits the SAND message serving as second supply availability information which is generated.

Upon receiving the (n+1)-th SAND message, the DASH client unit 140 selects the stream to be requested thereafter with reference to the received SAND message serving as the supply availability information, and transmits the segment request corresponding to the selection to the proxy server unit 130.

Here, if an (n+1)-th supply availability information which is transmitted is compared with an n-th supply availability information which is received, the C/N decreases from 80 db to 30 db in both of the two types of data pipes of the broadcast receiving unit 110, and thus the reception state of the broadcast receiving unit 110 is likely to deteriorate in the future.

In this regard, in step S35, the DASH client unit 140 activates the inactive mobile communication unit 160 in normal circumstances in order to check the reception state of another network module (in this case, the mobile communication unit 160).

In step S36, the activated mobile communication unit 160 measures the reception state in its own data pipe and notifies the proxy server unit 130 of the measurement result.

Further, as a process of step S37, a notification indicating the measurement result of the reception state in each of the two types of data pipes is transmitted from the communication unit 120 to the proxy server unit 130. In this regard, in step S38, the proxy server unit 130 which has received the notification generates the SAND message serving as the supply availability information in which the reception state of each data pipe is described in the reason element, and transmits a response in which the url at which the generated SAND message is stored is stored in the header of the response to the segment request, and the binary data (mp4 file) of the requested segment file is stored in the body to the DASH client unit 140.

The DASH client unit 140 that has received an (n+2)-th response decodes the mp4 file stored in the body thereof, performs rendering, reproduces the requested stream, and requests the SAND message serving as the supply availability information on the basis of the url stored in the header thereof. In response to this request, the proxy server unit 130 transmits the SAND message serving as the supply availability information generated in step S38.

Upon receiving the SAND message, the DASH client unit 140 selects the stream to be requested thereafter with reference to the received SAND message serving as the supply availability information, and transmits the segment request corresponding to the selection to the proxy server unit 130.

Further, if an (n+2)-th supply availability information which is transmitted is compared with an (n+1)-th supply availability information which is received, the C/N further decreases in the two types of data pipes of the broadcast receiving unit 110, and thus the DASH client unit 140 can select the i-Video received by the mobile communication unit 160 as the stream to be received later.

As described above, the DASH client unit 140 of the client device 100 can acquire the supply availability information from the proxy server unit 130 installed in the same client device 100. Therefore, after the supply availability information is acquired, it is possible to request the segment suitable for set conditions (for example, robustness priority, image quality priority, or the like).

Further, the DASH client unit 140 of the client device 200 connected to the client device 100 via the LAN 20 can acquire the supply availability information from the proxy server unit 130 installed in the client device 110. Therefore, after the supply availability information is acquired, it is possible to request the segment suitable for set conditions (for example, robustness priority, image quality priority, or the like).

Meanwhile, a series of processes described above can be executed by hardware or software. In a case where a series of processes is executed by software, a program constituting the software is installed in a computer. Here, examples of the computer include a computer incorporated into dedicated hardware, a general-purpose personal computer capable of executing various kinds of functions as various kinds of programs are installed, and the like.

Figure 24:
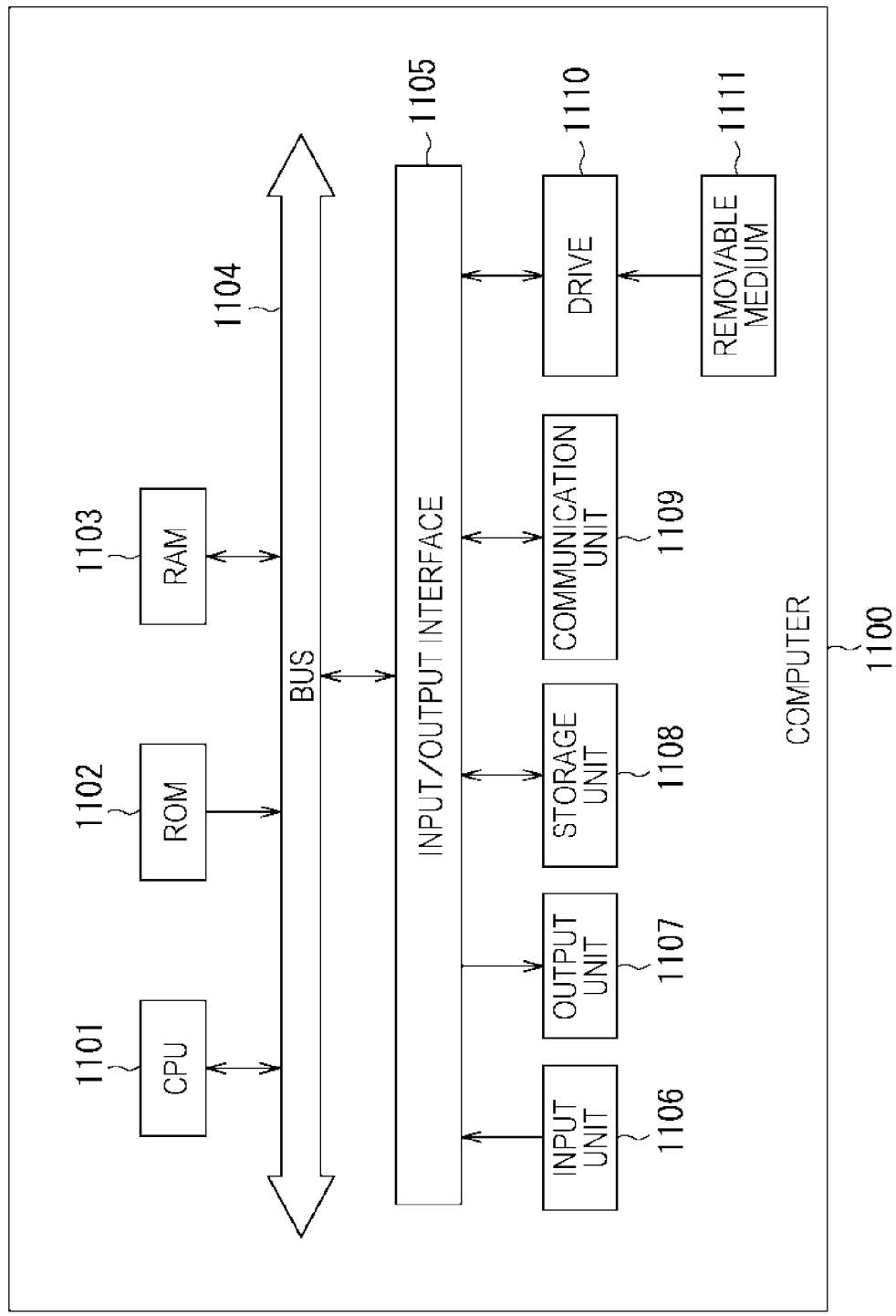
FIG. 24 is a block diagram illustrating a configuration example of a general-purpose computer.

FIG. 24 is a block diagram illustrating a hardware configuration example of a computer that executes a series of processes described above by a program.

In a computer 1100, a central processing unit (CPU) 1101, a read only memory (ROM) 1102, and a random access memory (RAM) 1103 are connected to one another via a bus 1104.

Further, an input/output interface 1105 is connected to the bus 1104. An input unit 1106, an output unit 1107, a storage unit 1108, a communication unit 1109, and a drive 1110 are connected to the input/output interface 1105.

The input unit 1106 includes a keyboard, a mouse, a microphone, or the like. The output unit 1107 includes a display, a speaker, or the like. The storage unit 1108 includes a hard disk, a nonvolatile memory, or the like. The communication unit 1109 includes a network interface or the like. The drive 1110 drives a removable medium 1111 such as a magnetic disk, an optical disk, a magneto-optical disk, or a semiconductor memory.

In the computer 1100 having the configuration described above, the CPU 1101 loads, for example, a program stored in the storage unit 1108 onto the RAM 1103 via the input/output interface 1105 and the bus 1104 and executes the program, whereby a series of processes described above is performed.

For example, the program executed by the computer 1100 (CPU 1101) can be provided in a form recorded in the removable medium 1111 serving as a package medium or the like. Further, the program can be provided via a wired or wireless transmission medium such as a local area network, the Internet, or digital satellite broadcasting.

In the computer 1100, the removable medium 1111 is loaded into the drive 1110, and then the program can be installed in the storage unit 1108 via the input/output interface 1105. Further, the program can be received by the communication unit 1109 via a wired or wireless transmission medium and installed in the storage unit 1108. Further, the program can be installed in the ROM 1102 or the storage unit 1108 in advance.

Further, the program executed by the computer 1100 may be a program in which processes are performed chronologically in accordance with the order described in this specification or the processes may be executed in parallel or at a necessary timing such as a case where calling is performed.

Further, the embodiment of the present disclosure is not limited to the embodiment described above, and various modifications can be made without departing from the gist of the present disclosure.

The present disclosure can also take the following configurations.

(1)

A receiving device, including:

a receiving unit configured to receive a segment file constituting a stream of content;

a reproducing unit configured to acquire and reproduce the segment file received by the receiving unit; and a proxy server unit configured to generate supply availability information including a probability at which a segment file possibly requested by the reproducing unit can be supplied to the reproducing unit on the basis of a reception state of the segment file by the receiving unit, in which the proxy server unit generates the supply availability information in response to a request for the segment file from the reproducing unit and supplies the segment file received by the receiving unit to the reproducing unit, and the reproducing unit requests the proxy server unit to transmit a segment file to be reproduced next on the basis of the generated supply availability information.

(2)

The receiving device according to (1), in which the receiving unit receives the segment file via a broadcasting network, a two-way communication network, or a mobile telephone communication network.

(3)

The receiving device according to (1) or (2), in which the proxy server unit includes a caching unit configured to cache the segment file received by the receiving unit, and supplies the segment file cached in the caching unit to the reproducing unit in a case where the segment requested from the reproducing unit is cached in the caching unit.

(4)

The receiving device according to any of (1) to (3), in which the proxy server unit generates the supply availability information further including reception metrics for a data path in which the segment file possibly requested by the reproducing unit is received and values of the reception metrics on the basis of the reception state of the segment file by the receiving unit.

(5)

The receiving device according to any of (1) to (4), in which the proxy server unit generates the supply availability information obtained by extending a ResourceStatus message according to a SAND protocol.

(6)

The receiving device according to any of (1) to (4), in which the proxy server unit generates the supply availability information obtained by extending a DaneResourceStatus message according to a SAND protocol.

(7)

The receiving device according to any of (1) to (6), in which the proxy server unit stores acquisition destination information of the supply availability information in a header of a response according to the request of the segment file from the reproducing unit and stores binary data of the segment file in a body of the response.

(8)

A receiving method of a receiving device including a receiving unit configured to receive a segment file constituting a stream of content, a reproducing unit configured to acquire and reproduce the segment file received by the receiving unit, and a proxy server unit configured to generate supply availability information including a probability at which a segment file possibly requested by the reproducing unit can be supplied to the reproducing unit on the basis of a reception state of the segment file by the receiving unit, the receiving method including:

a first request step of requesting, by the reproducing unit, the proxy server unit to transmit the segment file;

a supply step of generating, by the proxy server unit, the supply availability information in response to the request for the segment file from the reproducing unit and supplying the segment file received by the receiving unit to the reproducing unit; and a second request step of requesting, by the reproducing unit, the proxy server unit to transmit the segment file to be reproduced next on the basis of the supply availability information.

(9)

A program for causing a computer to function as:

a receiving unit configured to receive a segment file constituting a stream of content;

a reproducing unit configured to acquire and reproduce the segment file received by the receiving unit; and a proxy server unit configured to generate supply availability information including a probability at which a segment file possibly requested by the reproducing unit can be supplied to the reproducing unit on the basis of a reception state of the segment file by the receiving unit, in which the proxy server unit generates the supply availability information in response to a request for the segment file from the reproducing unit and supplies the segment file received by the receiving unit to the reproducing unit, and the reproducing unit requests the proxy server unit to transmit a segment file to be reproduced next on the basis of the generated supply availability information.

(10)

A reproducing device connected to a supply device that supplies content via a predetermined network, including:

a requesting unit configured to request the supply device to transmit a segment file constituting the content on the basis of supply availability information generated by the supply device; and a reproducing unit configured to reproduce the segment file supplied from the supply device in response to the request, in which the supply device includes a receiving unit configured to receive the segment file constituting a stream of the content, and a proxy server unit configured to generate the supply availability information including a probability at which the segment file possibly requested by the reproducing device can be supplied to the reproducing device on the basis of a reception state of the segment file by the receiving unit.

(11)

The reproducing device according to (10), in which the predetermined network is a LAN.

(12)

A reproducing method of a reproducing device connected to a supply device that supplies content via a predetermined network, including:

a first request step of requesting, by the reproducing device, the supply device to transmit a segment file constituting the content;

a reproduction step of reproducing, by the reproducing device, the segment file supplied from the supply device in response to the request; and a second request step of requesting, by the reproducing device, the supply device to transmit a segment file to be reproduced next on the basis of the supply availability information generated by the supply device, in which the supply device includes a receiving unit configured to receive the segment file constituting a stream of the content, and a proxy server unit configured to generate the supply availability information including a probability at which the segment file possibly requested by the reproducing device can be supplied to the reproducing device on the basis of a reception state of the segment file by the receiving unit.

(13)

A program for causing a computer connected to a supply device that supplies content via a predetermined network to function as:

a requesting unit configured to request the supply device to transmit a segment file constituting the content on the basis of supply availability information generated by the supply device; and a reproducing unit configured to reproduce the segment file supplied from the supply device in response to the request, in which the supply device includes a receiving unit configured to receive the segment file constituting a stream of the content, and a proxy server unit configured to generate the supply availability information including a probability at which the segment file possibly requested by the reproducing device can be supplied to the reproducing device on the basis of a reception state of the segment file by the receiving unit.

(14)

A supply device that supplies content to a reproducing device via a predetermined network, including:

a receiving unit configured to receive a segment file constituting a stream of the content; and a proxy server unit configured to generate supply availability information including a probability at which the segment file possibly requested by the reproducing device can be supplied to the reproducing device on the basis of a reception state of the segment file by the receiving unit in response to a request for the segment file from the reproducing device and supply the segment file received by the receiving unit to the reproducing device.

(15)

A supply method of a supply device including a receiving unit configured to receive a segment file constituting a stream of content, the supply device supplying the segment file to a reproducing device via a predetermined network, the supply method including:

a generation step of generating, by the supply device, supply availability information including a probability at which the segment file possibly requested by the reproducing device can be supplied to the reproducing device on the basis of a reception state of the segment file by the receiving unit in response to a request for the segment file from the reproducing device; and a supply step of supplying the segment file received by the receiving unit to the reproducing device.

(16)

A program for causing a computer that supplies content to a reproducing device via a predetermined network to function as:
  a receiving unit configured to receive a segment file constituting a stream of the content; and
  a proxy server unit configured to generate supply availability information including a probability at which the segment file possibly requested by the reproducing device can be supplied to the reproducing device on the basis of a reception state of the segment file by the receiving unit in response to a request for the segment file from the reproducing device and supply the segment file received by the receiving unit to the reproducing device.

REFERENCE SIGNS LIST

10 Broadcaster
11 Broadcasting network
12 CDN
20 LAN
100 Client device
110 Broadcast receiving unit
120 Communication unit
130 Proxy server unit
140 DASH client unit
200 Client device
300 DANE
400 DASH client
160 Mobile communication unit

The invention claimed is:

1. A receiving device, comprising:
  a receiver configured to receive a first segment file constituting a stream of content;
  circuitry configured to acquire and reproduce the first segment file received by the receiver; and
  a proxy server configured to, in response to a request for the first segment file from the circuitry, generate supply availability information including an availability status of a second segment file and a separate probability at which the second segment file can be supplied to the circuitry, the probability being relative to a probability that other segment files having a same availability status as the second segment file can be supplied to the circuitry,
  wherein the proxy server supplies the generated supply availability information together with the first segment file received by the receiver to the circuitry, and
  the circuitry requests the proxy server to transmit the second segment file to be reproduced next on the basis of the generated supply availability information.

2. The receiving device according to claim 1, wherein the receiver receives the first segment file via a broadcasting network, a two-way communication network, or a mobile telephone communication network.

3. The receiving device according to claim 2, wherein the proxy server includes a cache configured to cache the first segment file received by the receiver, and supplies the cached first segment file to the circuitry in a case where the first segment file requested from the circuitry is cached.

4. The receiving device according to claim 2, wherein the proxy server generates the supply availability information, including reception metrics for a data path in which the first segment file is received, values of the reception metrics being based on a reception state of the first segment file by the receiver.

5. The receiving device according to claim 2, wherein the proxy server generates the supply availability information obtained by extending a ResourceStatus message according to a Server and Network Assisted DASH (SAND) protocol.

6. The receiving device according to claim 2, wherein the proxy server generates the supply availability information obtained by extending a DaneResourceStatus message according to a Server and Network Assisted DASH (SAND) protocol.

7. The receiving device according to claim 2, wherein the proxy server stores acquisition destination information of the supply availability information in a header of a response according to the request for the first segment file from the circuitry and stores binary data of the first segment file in a body of the response.

8. The receiving device according to claim 1, wherein the supply availability information includes physical layer signal quality of reception of the first segment file by the receiver, including at least one of bit error rate, carrier to noise ratio, or received signal strength of the first segment file.

9. The receiving device according to claim 1, wherein the availability status indicates that the second segment file is available and the probability indicates the probability that the second segment file can be supplied to the circuitry, relative to a probability that other segment files having an availability status indicating available can be supplied.

10. A reproducing device connected to a supply device that supplies content via a network, comprising:
  circuitry configured to
    request the supply device to transmit a first segment file constituting the content on the basis of first supply availability information generated by the supply device, the first supply availability information including an availability status of the first segment file and a separate probability at which the first segment file can be supplied to the reproducing device, the probability being relative to a probability that other segment files having a same availability status as the first segment file can be supplied to the circuitry; and
    reproduce the first segment file supplied from the supply device in response to the request,
  wherein the supply device comprises
    a receiver configured to receive the first segment file constituting a stream of the content, and
    a proxy server configured to, in response to a request for the first segment file from the circuitry, generate second supply availability information including an availability status of a second segment file and a separate probability at which the second segment file can be supplied to the reproducing device, the probability being relative to a probability that other segment files having a same availability status as the second segment file can be supplied to the circuitry, the proxy server being configured to supply, to the circuitry, the generated second supply availability information together with the first segment file received by the receiver.

11. The reproducing device according to claim 10, wherein the network is a local area network (LAN).

12. A supply device that supplies content to a reproducing device via a predetermined network, comprising:
  a receiver configured to receive a first segment file constituting a stream of the content;
  a proxy server configured to, in response to a request for the first segment file from the reproducing device, generate supply availability information including an availability status of a second segment file and a probability at which the second segment file can be supplied to the reproducing device, the probability being relative to a probability that other segment files having a same availability status as the second segment file can be supplied to the reproducing device, the proxy server being further configured to supply the generated supply availability information together with the first segment file received by the receiver to the reproducing device.

* * * * *